US012688751B2

(12) United States Patent
Higgins et al.

(10) Patent No.: US 12,688,751 B2
(45) Date of Patent: Jul. 21, 2026

(54) ESTABLISHING A CASINO LINE OF CREDIT BASED ON CRYPTOCURRENCY HELD IN A CASINO CONTROLLED CUSTODIAN ACCOUNT

(71) Applicant: IGT, Las Vegas, NV (US)

(72) Inventors: Kevin M. Higgins, Reno, NV (US); George Tyrrell, Henderson, NV (US); Jeffery Shepherd, Reno, NV (US)

(73) Assignee: IGT, Las Vegas, NV (US)

( * ) Notice: Subject to any disclaimer, the term of this patent is extended or adjusted under 35 U.S.C. 154(b) by 362 days.

(21) Appl. No.: 18/208,626

(22) Filed: Jun. 12, 2023

(65) Prior Publication Data

US 2024/0412592 A1    Dec. 12, 2024

(51) Int. Cl.
*G07F 17/32* (2006.01)
*G06Q 20/24* (2012.01)
*G06Q 20/40* (2012.01)
*G06Q 50/34* (2012.01)

(52) U.S. Cl.
CPC ......... *G07F 17/3244* (2013.01); *G06Q 20/24* (2013.01); *G06Q 20/401* (2013.01); *G06Q 50/34* (2013.01); *G07F 17/3223* (2013.01); *G07F 17/3239* (2013.01)

(58) Field of Classification Search
CPC ............. G07F 17/3244; G07F 17/3223; G07F 17/3239; G06Q 20/24; G06Q 20/401; G06Q 50/34
See application file for complete search history.

(56) References Cited

U.S. PATENT DOCUMENTS

| | | | |
|---|---|---|---|
| 6,315,666 B1 | 11/2001 | Mastera et al. | |
| 6,371,852 B1 | 4/2002 | Acres | |
| 6,378,042 B1* | 4/2002 | Henderson .......... | G06F 12/0802 |
| | | | 711/134 |
| 6,379,247 B1 | 4/2002 | Walker et al. | |
| 6,857,959 B1 | 2/2005 | Nguyen | |
| 6,991,544 B2 | 1/2006 | Soltys et al. | |
| 7,008,321 B2 | 3/2006 | Rowe et al. | |
| 7,077,746 B2 | 7/2006 | Torango | |
| 7,112,138 B2 | 9/2006 | Hedrick et al. | |
| 7,311,605 B2 | 12/2007 | Moser | |
| 7,351,142 B2 | 4/2008 | Walker et al. | |
| 7,419,430 B1 | 9/2008 | Joshi et al. | |
| 7,617,151 B2 | 11/2009 | Rowe | |
| 7,674,180 B2 | 3/2010 | Graham et al. | |
| 7,722,453 B2 | 5/2010 | Lark et al. | |

(Continued)

OTHER PUBLICATIONS

"IRS Virtual Currency Guidance: Virtual currency is Treated as Property for U.S. Federal Tax Purposes; General rules for Property Transactions Apply," https://www.irs.gov/newsroom/irs-virtual-currency-guidance, printed on Nov. 8, 2018, 2 pages.

(Continued)

*Primary Examiner* — Jeffrey K Wong

(74) *Attorney, Agent, or Firm* — Neal, Gerber & Eisenberg LLP

(57)    ABSTRACT

Systems and methods that utilize an amount of cryptocurrency transferred to a gaming establishment controlled custodian account associated with an individual user as collateral in establishing a gaming establishment line of credit for that user.

20 Claims, 10 Drawing Sheets

(56) References Cited

U.S. PATENT DOCUMENTS

| | | | |
|---|---|---|---|
| 7,740,538 B2 | 6/2010 | Nguyen et al. | |
| 7,822,688 B2 | 10/2010 | Labrou et al. | |
| 7,867,079 B2 | 1/2011 | Govender et al. | |
| 7,927,212 B2 | 4/2011 | Hedrick et al. | |
| 7,946,917 B2 | 5/2011 | Kaminkow et al. | |
| 7,980,948 B2 | 7/2011 | Rowe et al. | |
| 7,985,133 B2 | 7/2011 | Baerlocher et al. | |
| 7,993,197 B2 | 8/2011 | Kaminkow | |
| 7,993,199 B2 | 8/2011 | Iddings et al. | |
| 7,997,978 B2 | 8/2011 | Kaminkow et al. | |
| 8,449,378 B2 | 5/2013 | Michaelson et al. | |
| 10,546,463 B2 | 1/2020 | Higgins et al. | |
| 10,885,740 B2 | 1/2021 | Higgins et al. | |
| 11,227,466 B2 | 1/2022 | Rousseau et al. | |
| 11,238,444 B2 | 2/2022 | Kilgore et al. | |
| 11,308,761 B2 | 4/2022 | Purohit et al. | |
| 11,341,814 B2 | 5/2022 | Higgins et al. | |
| 11,482,074 B1 | 10/2022 | Dickson | |
| 2002/0177480 A1 | 11/2002 | Rowe | |
| 2003/0212597 A1 | 11/2003 | Ollins | |
| 2004/0038733 A1* | 2/2004 | Walker | G07F 17/3244 |
| | | | 463/25 |
| 2005/0027381 A1 | 2/2005 | George et al. | |
| 2005/0096124 A1 | 5/2005 | Stronach | |
| 2006/0058099 A1 | 3/2006 | Soukup et al. | |
| 2006/0084496 A1 | 4/2006 | Jaffe et al. | |
| 2006/0148555 A1 | 7/2006 | Dent et al. | |
| 2006/0279044 A1 | 12/2006 | Pacey | |
| 2007/0060310 A1 | 3/2007 | Juds et al. | |
| 2007/0135215 A1 | 6/2007 | Walker et al. | |
| 2007/0191107 A1 | 8/2007 | Walker et al. | |
| 2008/0032762 A1 | 2/2008 | Kane et al. | |
| 2008/0139303 A1 | 6/2008 | Patterson | |
| 2010/0004045 A1* | 1/2010 | Roemer | G07F 17/3255 |
| | | | 463/43 |
| 2010/0120521 A1 | 5/2010 | Caputo et al. | |
| 2010/0216542 A1 | 8/2010 | Van Luchene | |
| 2011/0065497 A1 | 3/2011 | Patterson | |
| 2011/0300923 A1 | 12/2011 | Van Luchene | |
| 2012/0064961 A1* | 3/2012 | Vancura | G07F 17/3265 |
| | | | 463/20 |
| 2012/0101886 A1 | 4/2012 | Subramanian et al. | |
| 2012/0184349 A1 | 7/2012 | Barclay et al. | |
| 2012/0215652 A1 | 8/2012 | Melvin et al. | |
| 2012/0239556 A1 | 9/2012 | Magruder et al. | |
| 2014/0114890 A1* | 4/2014 | Fujimaki | G06N 20/00 |
| | | | 706/12 |
| 2015/0209678 A1 | 7/2015 | Edwards et al. | |
| 2015/0310703 A1 | 10/2015 | Katz et al. | |
| 2016/0004409 A1 | 1/2016 | Katz et al. | |
| 2017/0092059 A1 | 3/2017 | Nelson | |
| 2017/0116824 A1 | 4/2017 | Katz et al. | |
| 2017/0262834 A1 | 9/2017 | Curtin et al. | |
| 2017/0352231 A1 | 12/2017 | Nelson | |
| 2018/0043265 A1 | 2/2018 | Edwards et al. | |
| 2018/0047249 A1 | 2/2018 | Nelson et al. | |
| 2018/0061179 A1 | 3/2018 | Miri et al. | |
| 2018/0268644 A1 | 9/2018 | Cong | |
| 2018/0315072 A1 | 11/2018 | Rubin | |
| 2019/0035209 A1 | 1/2019 | Simons et al. | |
| 2019/0130698 A1 | 5/2019 | Simons | |
| 2019/0362602 A1 | 11/2019 | Watt | |
| 2020/0152005 A1* | 5/2020 | Higgins | G07F 17/3227 |
| 2021/0398091 A1 | 12/2021 | Yan | |
| 2022/0130206 A1 | 4/2022 | Shepherd et al. | |
| 2022/0138845 A1 | 5/2022 | Shepherd et al. | |
| 2022/0188919 A1 | 6/2022 | Higgins et al. | |
| 2022/0198873 A1 | 6/2022 | Higgins et al. | |
| 2022/0198875 A1 | 6/2022 | Shepherd et al. | |
| 2023/0054446 A1* | 2/2023 | LaFever | H04W 12/75 |
| 2023/0067075 A1 | 3/2023 | Shepherd et al. | |

OTHER PUBLICATIONS

"Notice 2014-21," https://www.irs.gov/pub/irs-drop/n-14-21.pdf, printed on Nov. 8, 2018, 6 pages.

"Bitcoin and Taxes: What you Need to Know About Cryptocurrency and the IRS," http://fortune.com/2018/01/29/bitcoin-taxes-cryptocurrency-irs/, written by Jeff John Roberts, Jan. 29, 2018, 3 pages.

Casino Transactions Via Crypto Assets, Bitline, retrieved May 15, 2025, https://www.bitline.io.

EBX—Everi, retrieved May 15, 2025, https://www.everi.com/fintech/payments/ebx.

How to Create a Guarantee on Bitline, YouTube, retrieved May 15, 2025, https://www.youtube.com/watch/v=oWs_wzLKTcw (Year: 2021).

How to Use the Bitline App, YouTube, retrieved May 15, 2025, https://www.youtube.com/watch/v=2GE-1xic4as (Year: 2021).

Introducing Bitline, YouTube, retrieved May 15, 2025, https://www.youtube.com/watch/v=9hq19AgyupU (Year: 2021).

* cited by examiner

ESTABLISHING A CASINO LINE OF CREDIT BASED ON CRYPTOCURRENCY HELD IN A CASINO CONTROLLED CUSTODIAN ACCOUNT

CROSS-REFERENCE TO RELATED APPLICATIONS

This application is related to the following commonly owned co-pending patent applications: U.S. application Ser. No. 18/208,727, entitled "VARIABLE CASINO LINES OF CREDIT BASED ON DIFFERENT PROPERTIES OF CRYPTOCURRENCY HELD IN A CASINO CONTROLLED CUSTODIAN ACCOUNT"; and U.S. application Ser. No. 18/208,740, entitled "ESTABLISHING A LIMITED DURATION CASINO LINE OF CREDIT BASED ON CRYPTOCURRENCY HELD IN A CASINO CONTROLLED CUSTODIAN ACCOUNT".

BACKGROUND

In various embodiments, the systems and methods of the present disclosure utilize an amount of cryptocurrency transferred to a gaming establishment controlled custodian account associated with an individual user as collateral in establishing a gaming establishment line of credit for that user.

Gaming machines may provide players awards in primary games. Gaming machines generally require the player to place a wager to activate the primary game. The award may be based on the player obtaining a winning symbol or symbol combination and on the amount of the wager.

BRIEF SUMMARY

In certain embodiments, the present disclosure relates to a system including a processor, and a memory device that stores a plurality of instructions. When executed by the processor following an identified user initiating, independent of the system, a transfer of a first amount of cryptocurrency from an external cryptocurrency account to a gaming establishment controlled custodian account associated with the identified user, the instructions cause the processor to independently determine whether to authorize the initiated transfer of the first amount of cryptocurrency in association with the gaming establishment controlled custodian account associated with the identified user. When executed by the processor responsive to the independent determination being to authorize the initiated transfer of the first amount of cryptocurrency, the instructions cause the processor to communicate data that enables the first amount of cryptocurrency to be transferred from the external cryptocurrency account to the gaming establishment controlled custodian account associated with the user. When executed by the processor following the identified user initiating a transfer of a second amount of cryptocurrency from the gaming establishment controlled custodian account associated with the identified user to the external cryptocurrency account, the instructions cause the processor to independently determine whether to authorize the initiated transfer of the second amount of cryptocurrency in association with the gaming establishment controlled custodian account. When executed by the processor responsive to the independent determination being to authorize the transfer of the second amount of cryptocurrency, the instructions cause the processor to communicate data that enables the second amount of cryptocurrency to be transferred from the gaming establishment controlled custodian account associated with the user to the external cryptocurrency account.

In certain embodiments, the present disclosure relates to a system including a processor, and a memory device that stores a plurality of instructions. When executed by the processor following an identified user initiating, independent of the system, a transfer of an amount of cryptocurrency from an external cryptocurrency account to a gaming establishment controlled custodian account associated with the identified user and responsive to a first independent determination to authorize a complete transfer of the amount of cryptocurrency to the gaming establishment controlled custodian account associated with the identified user, the instructions cause the processor to communicate data that enables the amount of cryptocurrency to be transferred from the external cryptocurrency account to the gaming establishment controlled custodian account associated with the user. In these embodiments, following the complete transfer, at least a portion of the amount of cryptocurrency is available to be pledged as collateral for a line of credit. When executed by the processor following the identified user initiating, independent of the system, the transfer of the amount of cryptocurrency from the external cryptocurrency account to the gaming establishment controlled custodian account associated with the identified user and responsive to a second independent determination to authorize a pending transfer of the first amount of cryptocurrency to the gaming establishment controlled custodian account associated with the identified user, the instructions cause the processor to communicate data that results in the amount of cryptocurrency being pending as transferred from the external cryptocurrency account to the gaming establishment controlled custodian account associated with the user. In these embodiments, while the transfer is pending, the amount of cryptocurrency is unavailable to be pledged as collateral for any line of credit.

In certain embodiments, the present disclosure relates to a method of operating a system. Following an identified user initiating, independent of the system, a transfer of a first amount of cryptocurrency from an external cryptocurrency account to a gaming establishment controlled custodian account associated with the identified user, the method includes independently determining, by a processor, whether to authorize the initiated transfer of the first amount of cryptocurrency in association with the gaming establishment controlled custodian account associated with the identified user. Responsive to the independent determination being to authorize the initiated transfer of the first amount of cryptocurrency, the method includes communicating data that enables the first amount of cryptocurrency to be transferred from the external cryptocurrency account to the gaming establishment controlled custodian account associated with the user. In these embodiments, following the identified user initiating a transfer of a second amount of cryptocurrency from the gaming establishment controlled custodian account associated with the identified user to the external cryptocurrency account, the method includes independently determining, by the processor, whether to authorize the initiated transfer of the second amount of cryptocurrency in association with the gaming establishment controlled custodian account. Responsive to the independent determination being to authorize the transfer of the second amount of cryptocurrency, the method includes communicating data that enables the second amount of cryptocurrency to be transferred from the gaming establishment controlled custodian account associated with the user to the external cryptocurrency account.

Additional features are described herein, and will be apparent from the following Detailed Description and the figures.

DETAILED DESCRIPTION

Figure 1:
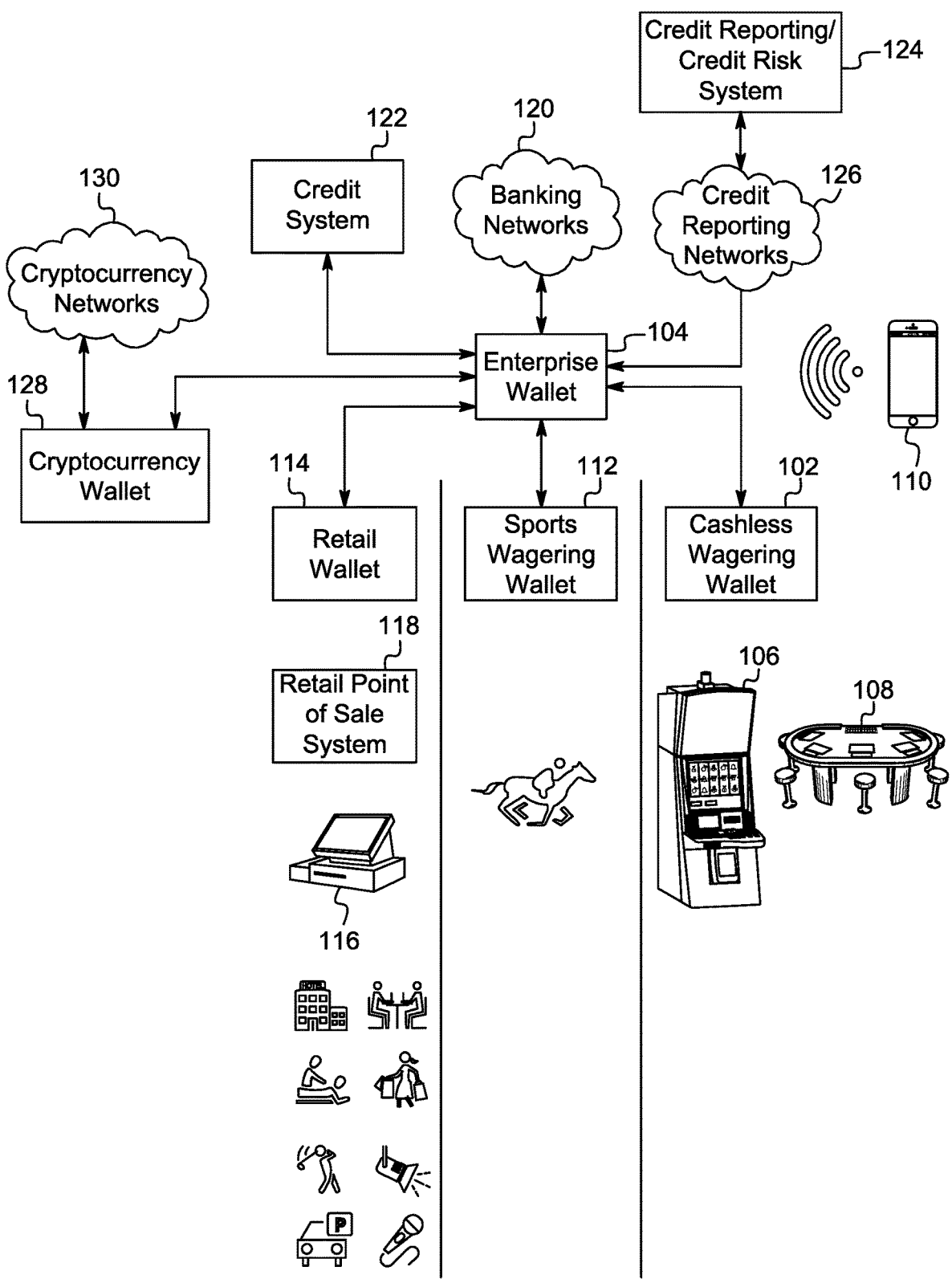
FIG. 1 is an example configuration of the architecture of a plurality of different components of the system of the present disclosure.

In various embodiments, the systems and methods of the present disclosure utilize an amount of cryptocurrency transferred to a gaming establishment controlled custodian account associated with an individual user as collateral in establishing a gaming establishment line of credit for that user.

In certain embodiments, to enable a user, such as a player, to access funds associated with a line of credit at one or more verticals of a gaming establishment, the system creates a cryptocurrency custodial account associated with the user (or otherwise accesses a previously created cryptocurrency custodial account associated with the user). In these embodiments, while the cryptocurrency custodian account is associated with the user (and operates as a destination wallet of cryptocurrency held by the user), the cryptocurrency custodian account is controlled by a component of the gaming establishment fund management system such that upon a cryptocurrency transfer event, the component of the gaming establishment fund management system coordinates the transfer of the cryptocurrency to the cryptocurrency custodian account associated with the user. In other words, while a user can request that an amount of cryptocurrency associated with user is deposited into the cryptocurrency custodian account and while the user can additionally or alternatively request that an amount of cryptocurrency is transferred from the cryptocurrency custodian account, the authority to complete such transactions is held by the component of the gaming establishment fund management system (and not the user).

In certain embodiments, following a user's request to transfer cryptocurrency funds to the cryptocurrency custodian account and the corresponding approval of the transfer by the component of the gaming establishment fund management system that controls the cryptocurrency custodian account, the system enables the user to request a line of credit backed by the cryptocurrency funds held in the cryptocurrency custodian account. In these embodiments, the system utilizes the cryptocurrency funds transferred to the cryptocurrency custodian account as a form of collateral against which an amount of funds of a line of credit may be activated. In certain such embodiments, in determining an amount of funds to make available from a line of credit upon an occurrence of a line of credit creation event and due to the relatively dynamic nature of cryptocurrencies, the system employs one or more conversion factors to determine an amount of funds to associate with the line of credit. That is, since the value of cryptocurrency fluctuates more than other forms of currency, the system determines an amount of funds available from a line of credit backed by cryptocurrency based on potential value fluctuations of the underlying cryptocurrency.

In certain embodiments, following a determination of an amount of funds to be made available in association with a line of credit backed by cryptocurrency and a corresponding approval of the line of credit, the system enables the user to activate funds against the line of credit for use at one or more touchpoints associated with the gaming establishment. For example, the system enables the user to activate funds of the line of credit and transfer such funds to a cashless wagering account to fund gaming activities at an electronic gaming machine or a gaming table. In certain embodiments, as part of offering a user a line of credit backed by an amount of cryptocurrency as collateral, the system places one or more restrictions on the backed cryptocurrency held in the cryptocurrency custodian account. For example, once an amount of funds are activated from the line of credit, the system restricts further access to the backed cryptocurrency (e.g., further lines of credit using the backed cryptocurrency and/or any transfers of the cryptocurrency from the cryptocurrency custodian account) until the amount of funds activated from the line of credit are paid back.

In certain embodiments, after the activation of an amount of funds from a line of credit backed by cryptocurrency funds and upon a line of credit repayment event, such as when the funds borrowed on the line of credit are due, the system enables the user to settle the line of credit in a variety of different ways. One such way includes using funds held by the user, such as held cash and/or funds held in one or more other accounts, to pay off part or all of the amount of debt owed on the line of credit. Another additional or alternative way includes using part or all of the cryptocurrency held in the cryptocurrency custodian account to pay off part or all of the amount of debt owed on the line of credit. In this way, the component of the gaming establishment fund management system operates with one or more cryptocurrency brokers to sell part or all of the cryptocurrency held in the cryptocurrency custodian account to cover part or all of the amount of debt owed on the line of credit. In these different ways, once the line of credit is paid off via non-cryptocurrency funds and/or selling part or all of the cryptocurrency held in the cryptocurrency custodian account, the component of the gaming establishment fund management system removes any holds placed on the cryptocurrency and, upon a request, coordinates the transfer of the cryptocurrency from the cryptocurrency custodian account associated with the user to a destination account, such as the cryptocurrency account which the cryptocurrency was initially transferred from.

Accordingly, in view of the accepted uses of cryptocurrency funds in commerce, the systems and method of the present disclosure enable a user's cryptocurrency to be utilized as collateral for one or more lines of credit without potentially missing out on any appreciation of the cryptocurrency while such cryptocurrency is held in a gaming establishment controlled cryptocurrency custodian account. Such a configuration thus enhances the user's gaming establishment experience by providing access to funds based on cryptocurrency holdings that certain users prefer. In doing so, the system provides that digital or virtual currencies are usable as collateral at a gaming establishment in the same fashion that other forms of collateral, such as a paycheck held at a casino cage, may be used as collateral at a gaming establishment.

In various embodiments, the present disclosure is directed to a gaming establishment fund management system including various sub-systems that are each associated with or otherwise maintain one or more electronic or virtual accounts. In these embodiments, the various accounts maintained for a user individually or collectively form a resort or enterprise account (i.e., a gaming establishment fund management account) for the user. That is, the collection of cryptocurrency accounts (i.e., cryptocurrency wallets), cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user individually or collectively form a resort or enterprise account (i.e., an integrated resort or gaming establishment fund management wallet) that the user may access to transfer funds and/or view balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In certain embodiments, the gaming establishment fund management system includes a first cashless wagering system that maintains a first cashless wagering account. In these embodiments, a user, such as a player of an electronic gaming machine ("EGM"), utilizes a mobile device application running on a mobile device and/or a physical instrument (e.g., a smart card or a user issued magnetic striped card which the user utilizes via inserting the card into a card reader associated with the EGM) to facilitate the electronic transfer of any funds between this first cashless wagering account and a gaming device, such as a component of a gaming table and/or an EGM (including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities)). For example, as seen in FIG. 1, the gaming establishment fund management system includes a first cashless wagering system that maintains a cashless wagering wallet 102 (e.g., a first cashless wagering account) which is in communication with an enterprise wallet 104 to enable a user access to transferring funds to/from the cashless wagering wallet and/or view balance information including balance information of the cashless wagering wallet. In this example, to facilitate the transfer of funds between this cashless wagering account and a credit balance of an EGM 106 and/or a credit balance of a gaming table component (not shown) associated with a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic striped card which the user utilizes via inserting the card into a kiosk) to facilitate the electronic transfer of any funds between this second cashless wagering account and a credit balance accessible to wager on sporting events and/or games of chance (or games of skill) remote from an EGM and a gaming table. For example, as seen in FIG. 1, the gaming establishment fund management system includes a second cashless wagering system that maintains a sports wagering wallet 112 (e.g., a second cashless wagering account) which is in communication with the enterprise wallet 104 to enable a user access to transferring funds to/from the sports wagering wallet and/or view balance information including balance information of the sports wagering wallet. In this example, to facilitate the transfer of funds between this cashless wagering account and a credit balance associated with a sporting event wagering system (not shown) and/or a remote wagering system (not shown) to enable the placement of one or more wagers on one or more sporting events and/or one or more games of chance (or games of skill), the system utilizes a mobile device 110 running a mobile device application that interfaces with one or more components of the gaming establishment fund management system to enable, amongst other activities, a user, such as a user remote from the gaming establishment, access to this second cashless wagering account.

In various embodiments, in addition to or an alternative of maintaining one or more cashless wagering accounts via one or more cashless wagering systems, the gaming establishment fund management system includes or is otherwise associated with one or more gaming establishment retail wallet systems that each maintain one or more gaming establishment retail accounts. In certain embodiments, such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users, such as retail patrons, to purchase goods and/or services via the user's gaming establishment retail account. For example, as seen in FIG. 1, the gaming establishment fund management system includes a gaming establishment retail wallet system that maintains a retail wallet 114 (e.g., a gaming establishment retail account) which is in communication with the enterprise wallet 104 to enable a user access to transferring funds to/from the retail wallet and/or view balance information including balance information of the retail wallet. In this example, to facilitate the transfer of funds between this gaming establishment retail account and an account associated with a gaming establishment retailer to purchase goods and/or services from the gaming establishment retailer, the system utilizes a retail wallet identity, such as a mobile device 110 running a mobile device application that interfaces with a point-of-sale terminal 116 of a retail point-of-sale system 118 of the gaming establishment retailer and/or a physical instrument (e.g., a smart card or a user issued magnetic striped card which the user utilizes in association with the point-of-sale terminal), and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a gaming establishment retailer.

In certain embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services wherein such funds deposited in the gaming establishment retail account may be converted to or otherwise redeemable for cash or check.

In certain embodiments, the gaming establishment fund management system is in communication with (or otherwise includes) one or more credit systems that each issue one or more lines of credit or markers. For example, as seen in FIG. 1, a gaming establishment credit system (i.e., a credit system 122) is in communication with the enterprise wallet 104 to facilitate the establishment of an amount of funds via one or more lines of credits. Such lines of credit include cryptocurrency backed lines of credit of the present disclosure as well as non-cryptocurrency backed lines of credit, such as lines of credit backed by a check presented by a user (i.e., a check on board line of credit) and/or lines of credit based on assets of a user (e.g., funds held in a bank account, property holdings) relative to liabilities of the user (e.g., other lines of credit outstanding, home loans, business loans). In different embodiments, the system utilizes a mobile device running a mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interact with the gaming establishment credit system. It should be appreciated that while illustrated as the gaming establishment fund management system being in communication with one or more credit systems, in different embodiments, any component or sub-system of the present disclosure can be in communication with one or more credit systems.

In certain embodiments, the gaming establishment fund management system is also in communication with (or otherwise includes) one or more credit reporting/credit risk systems that monitor and report on various accounts associated with the user. For example, as seen in FIG. 1, one or more credit reporting networks 126 in communication with the enterprise wallet 104 are in communication with a credit reporting and risk system (i.e., a credit reporting/credit risk system 124). These network(s) and system(s) collectively monitor and report on a credit rating and status of one or more accounts maintained for the user at various funding sources, such as various financial institutions. It should be appreciated that while illustrated as the gaming establishment fund management system being in communication with one or more credit reporting networks and one or more credit reporting/credit risk systems, in different embodiments, any component or sub-system of the present disclosure can be in communication with one or more credit reporting/credit risk systems.

In various embodiments, the gaming establishment fund management system is in communication with (or otherwise includes) one or more cryptocurrency management systems that are each associated with or otherwise maintain one or more custodian cryptocurrency accounts. For example, as seen in FIG. 1, a cryptocurrency management system (not shown) that maintains a cryptocurrency wallet 128 is in communication with the enterprise wallet 104. In this example, the cryptocurrency management system enables a user access to request transfers of cryptocurrency funds to/from the cryptocurrency wallet and/or view balance information including balance information of the cryptocurrency wallet. In certain embodiments, the cryptocurrency management system that maintains the cryptocurrency wallets is in communication with an external cryptocurrency blockchain network 130 (e.g., a bitcoin blockchain network, an Ethereum blockchain network) which, as described below, operate to electronically transfer cryptocurrency between the user's external cryptocurrency account and the custodian cryptocurrency account that the gaming establishment fund management system maintains for that individual user. In certain embodiments, a user utilizes a mobile device application running on a mobile device to request the gaming establishment fund management system to execute an electronic transfer of any cryptocurrency funds to and from the custodian cryptocurrency account. In different embodiments, the system utilizes the mobile device running the mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interact with the cryptocurrency management system. It should be appreciated that while illustrated as the gaming establishment fund management system being in communication with the cryptocurrency management system, in different embodiments, any component or sub-system of the present disclosure can be in communication with one or more cryptocurrency management systems that maintain one or more cryptocurrency wallets.

It should be further appreciated that while described as the cryptocurrency management system of the gaming establishment fund management system maintaining each of the cryptocurrency custodian accounts, in different embodiments, one or more different components or sub-systems of the gaming establishment fund management system maintain one or more of the cryptocurrency custodian accounts. In certain embodiments, such cryptocurrency custodian accounts are implemented external to the gaming establishment fund management system. In such embodiments, one or more cryptocurrency protocols are utilized to transfer cryptocurrency funds from one or more external cryptocurrency accounts associated with the user in the external cryptocurrency blockchain network to the cryptocurrency custodian account associated with the user to enable such cryptocurrency funds to be used as collateral for one or more lines of credit.

In certain embodiments, the system maintains a cryptocurrency custodian account for different types of cryptocurrency funds. For example, for a user who pledges bitcoins and Ethereum as collateral for a line of credit, the cryptocurrency custodian account associated with that user holds both the bitcoins and the Ethereum. In another embodiment, the system maintains different cryptocurrency custodian accounts for different types of cryptocurrency funds. For example, for a user who pledges bitcoins and Ethereum as collateral for a line of credit, the system maintains bitcoin custodian account associated with that user and a Ethereum custodian account associated with the user. In these different embodiments, the cryptocurrency management system (and/or the gaming establishment fund management system) is in communication with each of the respective external cryptocurrency blockchain networks for each type of cryptocurrency custodian account that holds cryptocurrency funds. Moreover, to facilitate the transferring of cryptocurrency between an external cryptocurrency blockchain network and the cryptocurrency custodian account(s) associated with a user, the cryptocurrency management system (and/or the gaming establishment fund management system) creates and registers (as necessary) the respective cryptocurrency custodian account with the corresponding external cryptocurrency blockchain network. It should be appreciated that in various embodiments, a user may not need to "register" an account with their external cryptocurrency blockchain network. For example, in various embodiments, an account number for a cryptocurrency account is the public key associated with the cryptocurrency account. In certain such embodiments, a transaction request requesting a transfer of cryptocurrency funds is made by posting the transaction request to the cryptocurrency blockchain network using the public key and a person can only access those funds when the provide the corresponding private key.

In certain embodiments, the gaming establishment fund management system that maintains one or more gaming establishment accounts is in communication with an external funding system (i.e., a payment gateway) that is in communication with a network of one or more banks or other financial institutions which operate to electronically transfer funds between the user's accounts maintained at such banks or financial institutions and one or more of the accounts maintained by the gaming establishment fund management system. For example, as seen in FIG. 1, a network of one or more banks or other financial institutions (not shown) accessible via one or more banking networks 110 in communication with the enterprise wallet 104 operate to electronically transfer funds from the user's accounts maintained at such banks or financial institutions to the gaming establishment fund management system. In certain embodiments, the gaming establishment fund management system that maintains one or more gaming establishment accounts includes an external funding system that is in communication with a network of one or more banks or other financial institutions which operate to electronically transfer funds between the user's accounts maintained at such banks or financial institutions and one or more of the accounts maintained by the gaming establishment fund management system. In these different embodiments, the gaming establishment fund management account is associated with or otherwise operable to transfer funds to/from one or more external accounts, such as one or more credit card accounts maintained by one or more financial institutions, one or more debit card accounts maintained by one or more banks or credit unions, one or more financial institution accounts, such as a brokerage account, maintained by one or more financial institutions and/or one or more third-party maintained accounts (e.g., one or more PayPal® accounts or Venmo® accounts). In different embodiments, the system utilizes a mobile device running a mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interact with the external funding system. It should be appreciated that while described as the gaming establishment fund management system being in communication with the external funding system via the banking networks, in different embodiments, any system or sub-system of the present disclosure can be in communication with one or more external funding system.

In certain embodiments (not shown), the gaming establishment fund management system is in communication with one or more gaming establishment patron management systems that monitor activities at various points of contact associated with the gaming establishment and provides rewards, such as redeemable player tracking points, in association with such activities. In different embodiments, the system utilizes a mobile device running a mobile device application, a kiosk, an interface of a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment patron management system. It should be appreciated that while, in certain embodiments, the gaming establishment fund management system is in communication with one or more gaming establishment patron management systems, in different embodiments, any system or sub-system of the present disclosure can be in communication with one or more gaming establishment patron management systems.

In certain embodiments, the system utilizes one mobile device application to interact with the different components of the gaming establishment fund management system to, amongst other actions, access funds maintained in the different gaming establishment accounts associated with the user and/or request a transfer of cryptocurrency to/from a gaming establishment controlled cryptocurrency custodian account associated with a user. For example, utilizing the same mobile application, a mobile device interacts with both the first cashless wagering system of the gaming establishment fund management system and the gaming establishment retail wallet system of the gaming establishment fund management system. In certain embodiments, the system utilizes multiple mobile device applications to interact with the different components of the gaming establishment fund management system to, amongst other actions, access funds maintained in the different gaming establishment accounts associated with the user. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a QR code).

It should be appreciated that in different embodiments, in addition to or alternatively from utilizing a mobile device running a mobile device application to, amongst other actions, access funds associated with different gaming establishment accounts and/or request a transfer of cryptocurrency to/from a gaming establishment controlled cryptocurrency custodian account associated with a user, the system utilizes a kiosk, a gaming establishment device, such as a gaming device (e.g., an interface of an EGM or gaming table component) or a non-gaming device (e.g., a retail point-of-sale terminal), a service window displayed by a gaming establishment device (e.g., a remote host controlled service window displayed by an EGM), a display device/input device associated with a seat-level gaming table component, a display device/input device associated with a table-level gaming table component, a display device/input device associated with a mobile gaming table component, a component of a gaming establishment patron management system, such as a player tracking unit, and/or a gaming establishment interface, such as a casino desk, to, amongst other actions, access the funds associated with such gaming establishment accounts and/or request a transfer of cryptocurrency to/from a gaming establishment controlled cryptocurrency custodian account associated with a user. It should be further appreciated that while illustrated in FIG. 1 as using a mobile device running a mobile device application to access funds associated with different gaming establishment accounts (e.g., a cashless wagering account and a gaming establishment retail account) as mentioned above, a physical instrument, such as a smart card or a user issued magnetic striped card may additionally or alternatively be utilized to enable a user access to one or more gaming establishment accounts and/or request a transfer of cryptocurrency to/from a gaming establishment controlled cryptocurrency custodian account associated with a user.

In certain embodiments, the system enables a transfer of funds between different accounts maintained by different components associated with different gaming activities and/or non-gaming activities. In these embodiments, the system employs a service for interfacing with the various components to facilitate balance inquiry and transferring funds amongst the different accounts maintained by these various components. In certain embodiments, such a service collects data from various components and utilizes such collected data to provide a singular view of the balances (or a plurality of singular views of different groupings of balances). In certain embodiments, such a service additionally or alternatively provides facilities to enforce rules associated with the different accounts maintained by the various components. In different such embodiments, these rules include, but are not limited to, jurisdictional controls, self-imposed limits, state governmental controls and federal governmental controls, wherein the system provides the logic to determine how, and how much, to transfer from each account of the various interconnected components to satisfy a request for funds while staying within the confines of such rules. In certain embodiments, such a service additionally or alternatively tracks and coalesces transaction history across the accounts of the interconnected components of the system. In these embodiments, all transactions within the system have a "master" transaction record that ties all of the various fund transfers to a single initiating funds transfer regardless of how many accounts were withdrawn to the satisfy the original request.

In various embodiments, prior to utilizing an amount of cryptocurrency transferred to a gaming establishment controlled custodian account associated with an individual user as collateral in establishing a gaming establishment line of credit for that user, a user must first establish or otherwise become associated with (if needed) a gaming establishment controlled custodian account. In these embodiments, utilizing an interface, such as a mobile device application being executed by a mobile device, an EGM, a kiosk, and/or a website accessed from a browser, the user attempts to establish a gaming establishment controlled custodian account through one or more interactive forms. In certain embodiments, as part of creating a gaming establishment controlled custodian account, a user (whom has already logged into one or more gaming establishment fund management system accounts) makes one or more inputs via an interface to provide certain user identifying information, such as, but not limited to, additional address details, a social security number and/or a mother's maiden name, and/or certain cryptocurrency identifying information, such as, but not limited to, a blockchain address, a public key and/or a source account identifier.

In certain embodiments, as part of creating a gaming establishment controlled custodian account, a user (whom has already logged into one or more gaming establishment fund management system accounts) makes one or more inputs via an interface to associate or otherwise link an existing user account, such as a player tracking account and/or a gaming establishment fund management system account, with a gaming establishment controlled custodian account. In these embodiments, both accounts (i.e., the gaming establishment controlled custodian account and the existing user account) are linked to each other via one or more associations. In one such embodiment, both accounts are linked to each other through a gaming establishment patron management system identifier, such as through a player's loyalty account number of a player tracking system. In other such embodiments, both accounts are linked through one or more of: a gaming establishment controlled custodian account number, a gaming establishment fund management account number (e.g., a cashless wagering account number), a hash or token associated with the gaming establishment controlled custodian account number, a hash or token associated with the gaming establishment fund management account number, a hash or token of a gaming establishment patron management system identifier (e.g., a hash of a player tracking account number), a globally unique identifier (e.g., a 128-bit text string that represents an identification) associated with one of the accounts, and/or a primary key or unique identifier associated with one of the accounts. In certain embodiments, a component of one or more gaming establishment fund systems stores the relationship between the accounts in association with one or both of the accounts. In certain embodiments, a component of a separate, distinct system, such as a component of an account linkage system, stores the relationship between two or more of the various accounts.

It should be appreciated that since certain user identifying information and/or cryptocurrency identifying information is already associated with an existing user account linked to the gaming establishment controlled custodian account, such information is automatically associated with the gaming establishment controlled custodian account to minimize the amount of inputs the user makes to provide user identifying information and/or cryptocurrency identifying information. For example, since a user is already registered in a gaming establishment loyalty club program and the user's account with the gaming establishment loyalty club program has an assigned PlayerID or accountID (and is also likely associated with the user's various personally identifiable information), the user interfaces with one or more components of the gaming establishment to create a gaming establishment controlled custodian account and that gaming establishment controlled custodian account will be associated with the user's gaming establishment loyalty club program account.

In certain embodiments, as part of creating a gaming establishment controlled custodian account or in association with a previously created gaming establishment controlled custodian account, the system determines zero, one or more security measures to invoke in association with one or more transactions associated with the gaming establishment controlled custodian account. In these embodiments, to prevent the potential unauthorized access to funds borrowed against an amount of cryptocurrency held in such a gaming establishment controlled custodian account, the system applies certain determined security measures in association with certain transactions.

In certain embodiments, as part of creating a gaming establishment controlled custodian account or in association with a previously created gaming establishment controlled custodian account, the system determines one or more controls or restrictions, such as use limits, to associate with the gaming establishment controlled custodian account and/ or transactions associated with cryptocurrency held in such a gaming establishment controlled custodian account. In certain of these embodiments, if such conditions are satisfied, the system invokes one or more security measures. In certain other of these embodiments, if such conditions are satisfied, the system denies the approval of a transaction associated with cryptocurrency held in such a gaming establishment controlled custodian account. As such, to balance the need to prevent potential unauthorized access to the funds associated with a user's gaming establishment controlled custodian account against the need to provide a relatively frictionless experience for users, the system dynamically employs one or more controls, such that certain transactions trigger the need to potentially employ enhanced security measures and certain transactions do not trigger the need to potentially employ enhanced security measures.

In certain embodiments, following the creation of a gaming establishment controlled custodian account, if the user intends to use an amount cryptocurrency they hold to be used as collateral for an issued line of credit based upon that amount of cryptocurrency, the user first needs to transfer an amount of cryptocurrency to their gaming establishment controlled custodian account. It should be appreciated that since cryptocurrency is a digital item, such a transfer to the gaming establishment controlled custodian account enables the gaming establishment to have custody of the cryptocurrency, much like how a gaming establishment gets physical custody of a check when a user presents the check to gaming establishment personnel to obtain a line of credit issued against the check.

In certain embodiments, in association with establishing an amount of cryptocurrency funds in a gaming establishment controlled custodian account from one or more funding sources (i.e., the external cryptocurrency blockchain network), the system facilitates transferring cryptocurrency funds responsive to an occurrence of a cryptocurrency transfer event. In one such embodiment, responsive to an occurrence of a cryptocurrency transfer-in event, the system facilitates transferring funds from a user's external cryptocurrency account to the gaming establishment controlled custodian account associated with the user. In doing so, the system creates and submits a transaction request to the external cryptocurrency blockchain network where the user external cryptocurrency account is located to initiate the transfer of funds. It should be appreciated that in these embodiments, while the cryptocurrency custodian account is associated with the user (and operates as a destination wallet of cryptocurrency held by the user), the cryptocurrency custodian account is controlled by a component of the gaming establishment fund management system such that upon a cryptocurrency transfer event, the component of the gaming establishment fund management system coordinates the transfer of the cryptocurrency to the cryptocurrency custodian account associated with the user. In other words, while a user can request that an amount of cryptocurrency associated with user is deposited into the cryptocurrency custodian account and while the user can additionally or alternatively request that an amount of cryptocurrency is transferred from the cryptocurrency custodian account, the authority to complete such transactions is held by the component of the gaming establishment fund management system (and not the user).

In general, to transfer funds between the user's external cryptocurrency account and a gaming establishment controlled custodian account associated with the user, a transaction request is created and submitted to the respective cryptocurrency blockchain network by the cryptocurrency wallet (and/or the mobile device application) initiating the funds transfer. The transaction request includes (amongst other information) (1) a source account identifier (2) a destination account identifier, (3) a transfer type identifier (i.e., a deposit (or transfer-in) or a withdrawal (or transfer-out), and (4) a transfer amount. That is, to transfer cryptocurrency funds to a gaming establishment controlled custodian account, the user provides (1) a source account identifier associated with their external cryptocurrency account, (2) a destination account identifier associated with their gaming establishment controlled custodian account, (3) deposit (or transfer-in) event identifier, and (4) the transfer amount. It should be appreciated that the cryptocurrency wallet (and/or the mobile device application) initiating the funds transfer provides the source account identifier and/or the destination account identifier.

In certain cryptocurrency blockchain networks, cryptocurrency accounts are identified by a public key associated with that account. For example, if a user has a bitcoin account, then their bitcoin account number is represented (or identified) by a public key (i.e., an RSA public key) that is tied to their bitcoin account. The user keeps the corresponding private key (i.e., an RSA private key) secret and uses the corresponding private key to sign transaction requests submitted to the bitcoin blockchain network. Accordingly, for a user to trigger their external cryptocurrency account to transfer funds to the gaming establishment controlled custodian account, the user provides a public key associated with their gaming establishment controlled custodian account (and that represents the destination of the transaction request). In certain embodiments, the system also provides information related to the user triggering the transaction request so that the transferred funds can later be accessed by the user responsive to the user providing that information.

In certain embodiments, access to the user's gaming establishment controlled custodian account public key is restricted using gaming establishment credentials associated with the user (i.e., username/password information, a player tracking card and PIN, etc.). Once the user authenticates themselves using their gaming establishment credentials, the system enables the user to view their gaming establishment controlled custodian account public key and use that public key as the destination account identifier to include in the transaction request.

Figure 2A:
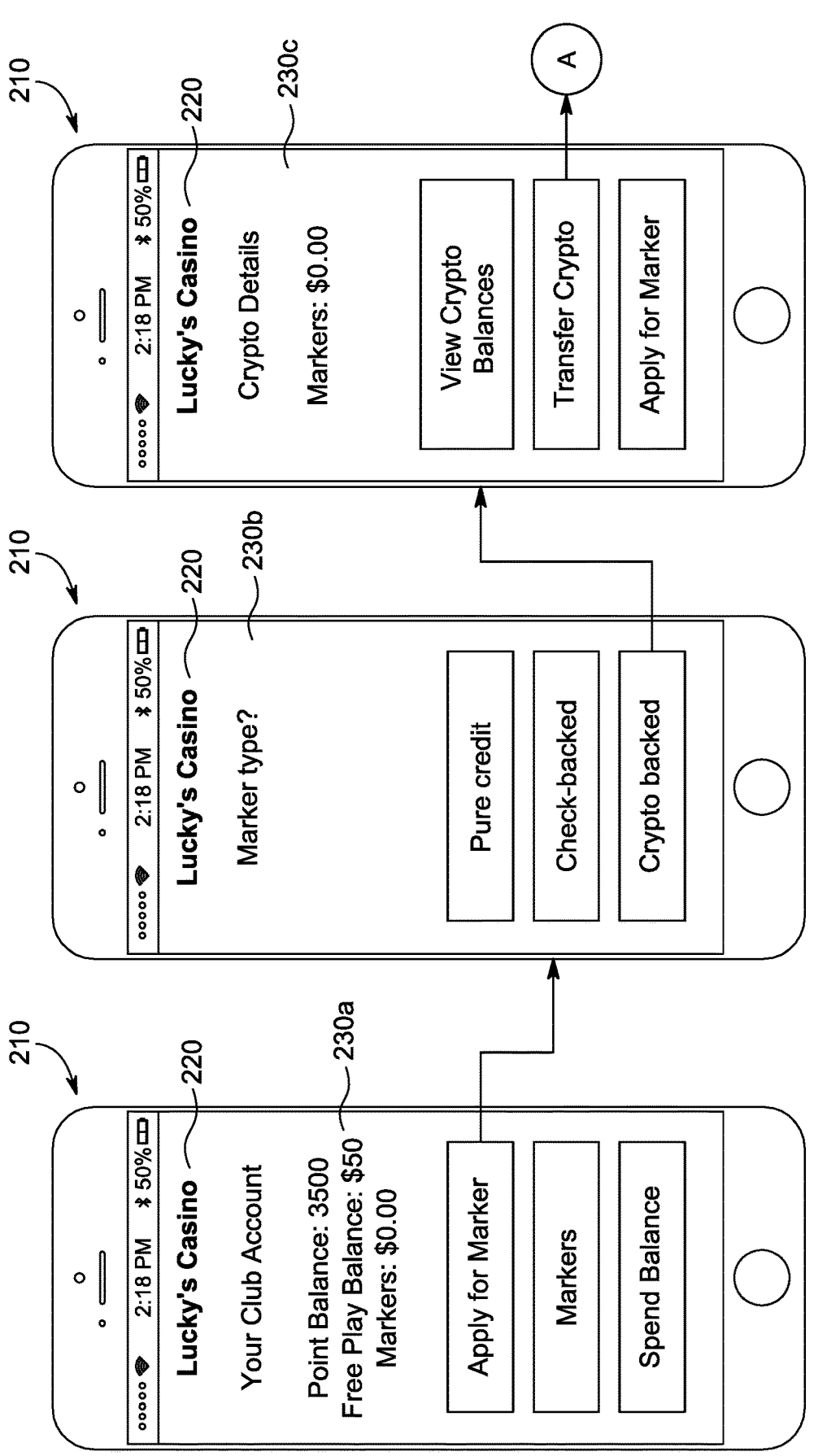
FIG. 2A is an example sequence of graphical user interfaces displayed on a mobile device in connection with a cryptocurrency to gaming establishment custodial account transfer event.
Figure 2A:
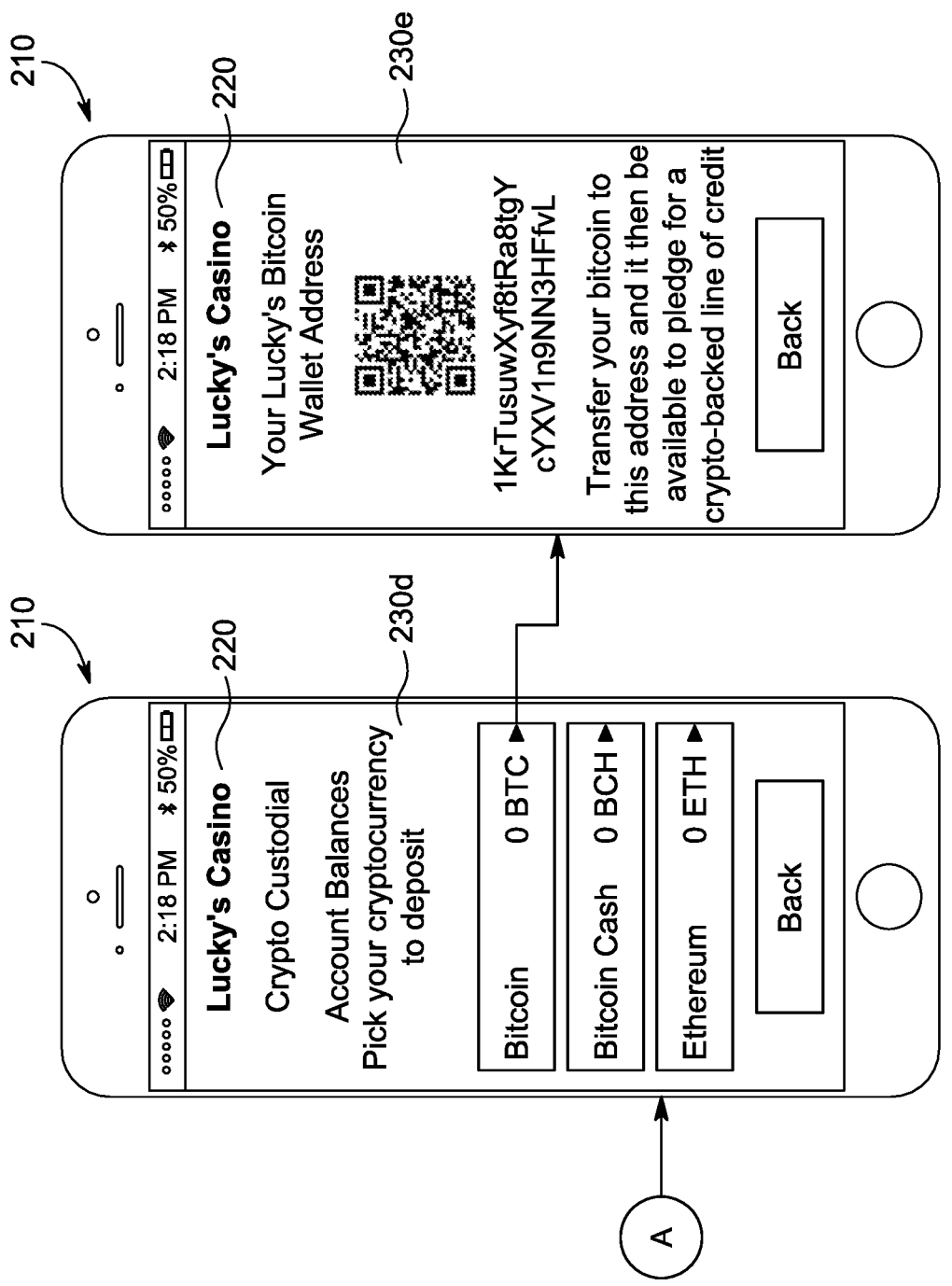

In certain embodiments, to transfer an amount of cryptocurrency into the gaming establishment controlled custodian account associated with the user, the user will need to know one or more cryptocurrency addresses that they should transfer their cryptocurrency to (i.e., an identifier of the gaming establishment controlled custodian account associated with the user). In one embodiment, the user is informed of this address by remotely accessing their gaming establishment controlled custodian account via one or more interfaces, such as a website or a mobile device application. For example, FIG. 2A illustrates a sequence of messages displayed via a mobile device application 220 of a mobile device 210 in which after the user authenticates themselves via their gaming establishment credentials (not shown), the mobile device application 220 displays a first message 230a to the user identifying one or more current balances of one or more accounts and/or lines of credit or markers (i.e., "$0.00"), and user-selectable options to apply for a marker, inquire about one or more existing markers and/or spend one or more balances of one or more accounts. Responsive to the user selecting the user-selectable option to apply for a marker, the mobile device application 220 displays a second message 230b to the user identifying different marker types available, such as a pure-credit marker (e.g., a line of credit issued based on an amount of credit associated with the user), a check-backed marker (e.g., a line of credit issued with a check presented by the user as collateral) or a crypto-backed marker (e.g. a line of credit issued with an amount of cryptocurrency as collateral) for the user to select. In this example, after selecting a crypto-backed marker, the mobile device application 220 displays a third message 230c to the user identifying the options of viewing one or more cryptocurrency balances, transferring an amount of cryptocurrency to the gaming establishment controlled custodian account or applying for a marker. Following the user's selection to transfer an amount of cryptocurrency to the gaming establishment controlled custodian account, the mobile device application 220 displays a fourth message 230d to the user illustrating the different external cryptocurrency accounts associated with the user and the amount of cryptocurrency in each external cryptocurrency account. In this example, the user selects their bitcoin account from which to make a deposit to the gaming establishment controlled custodian account associated with the user. Accordingly, the mobile device application 220 displays a fifth message 230e to the user identifying the public key of their gaming establishment controlled custodian account. As seen in the fifth message 230e, the public key is displayed by the mobile device 210 as a machine-readable code (i.e., a QR code) and as an alphanumeric string. However, it should be appreciated that other embodiments employ additional or alternative techniques for presenting the user's gaming establishment controlled custodian account public key, such as a linear barcode, a matrix barcode, a hyperlink, etc. The user then uses the gaming establishment controlled custodian account public key as the destination (or receiving) account identifier for the transaction request.

In another embodiment, the gaming establishment sends a destination address of the gaming establishment controlled custodian account to the user via an SMS/text, email, and/or a push notification. In another embodiment, a gaming establishment interface, such as gaming establishment personnel at a casino game, prints out a ticket with a destination address of the gaming establishment controlled custodian account and/or causes the destination address of the gaming establishment controlled custodian account to be displayed by a gaming establishment workstation. In these embodiments, the ticket and/or workstation displays a machine-readable code (i.e., a QR code) and/or an alphanumeric string associated with the destination address of the gaming establishment controlled custodian account. In another embodiment, the system employs a kiosk to assist the user in establishing the gaming establishment controlled custodian account and/or transferring an amount of cryptocurrency to the gaming establishment controlled custodian account. In this embodiment, the kiosk prints out a ticket with a destination address of the gaming establishment controlled custodian account and/or causes the destination address of the gaming establishment controlled custodian account to be displayed by a display device of the kiosk. In these embodiments, the ticket and/or kiosk display displays a machine-readable code (i.e., a QR code) and/or an alphanumeric string associated with the destination address of the gaming establishment controlled custodian account.

In certain embodiments, to enable the system to provide information related to the user, the system requests that the user provide certain information that links the user to the external cryptocurrency account (i.e., the source account). Said differently, to prevent unauthorized transfers of funds from external cryptocurrency accounts (i.e., from a cryptocurrency account not associated with the user), the system requests that the user provide information to verify that they are the owner of the external cryptocurrency account. In certain such embodiments, the system provides the user information (i.e., random data) to include in their transaction request submitted to the external cryptocurrency blockchain network. For example, before the user initiates the request to transfer cryptocurrency to the gaming establishment controlled custodian account, the system randomly generates information and associates the generated information with the user. In this example, the system employs the randomly generated information in verifying that the user is the owner of the external cryptocurrency account as part of a requested transfer of cryptocurrency to the gaming establishment controlled custodian account associated with the user. It should be appreciated that in certain embodiments, the system verifies that the user is the owner of the external cryptocurrency account (and that the user has available any cryptocurrency funds) prior to transferring any amount of cryptocurrency from the user's external cryptocurrency account to the gaming establishment controlled custodian account associated with the user.

In certain other embodiments, instead of providing the user information to include in the transaction request, the system requests that the user verify that they own the corresponding private key associated with the public key of the external cryptocurrency account. For example, the system generates random information (e.g., a timestamp, nonce) that the user signs with the private key associated with the transaction request. In certain such embodiments, the user provides the signed data (i.e., the random information) to the system for verification and the user also triggers a transfer of the funds via the external cryptocurrency blockchain network. Responsive to the system verifying the provided data (such as by comparing the signature of the provided data against a public key associated with the user's external cryptocurrency account that triggered the transfer), the system completes the transfer to the gaming establishment controlled custodian account associated with the user. However, if the system is unable to verify the provided data (e.g., if the signature of the provided data does not match the public key associated with the user's external cryptocurrency account), then the system does not complete the transaction or otherwise refunds the cryptocurrency funds transferred (such as within a period of time (e.g., within 14 days)) to the gaming establishment controlled custodian account associated with the user.

In various embodiments, the system maintains a transaction records log of transaction requests. Maintaining a transaction records log is useful for resolving disputes that may occur regarding transferring cryptocurrency funds to and/or from one or more gaming establishment controlled custodian accounts. Maintaining a transaction records log may also be useful in assisting in investigations conducted by authorities. In certain embodiments, the transaction records log includes one or more of cryptocurrency account public keys, user identifiers, transaction amounts, and/or timestamps stored by the system.

Figure 2B:
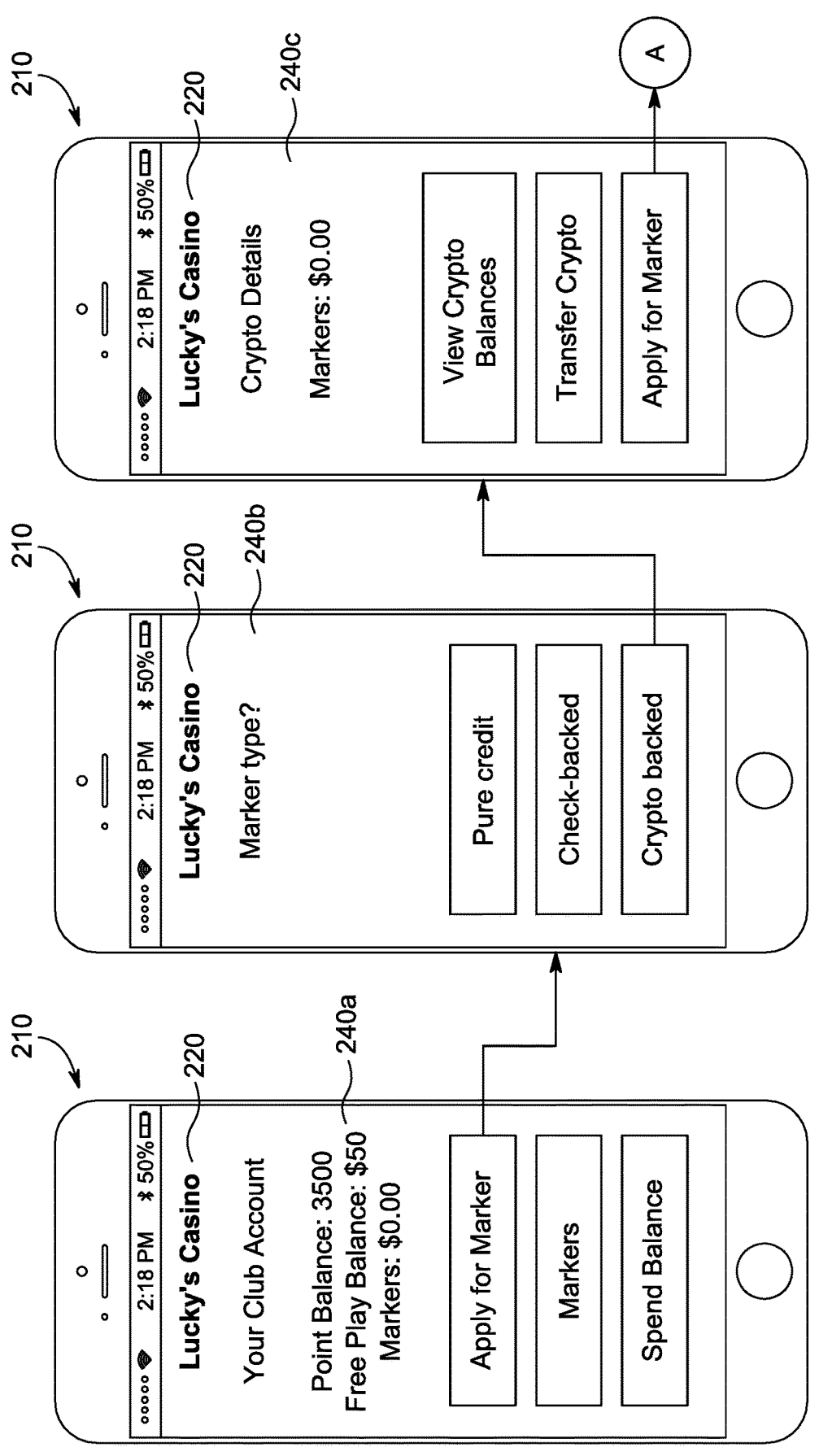
FIG. 2B is an example sequence of graphical user interfaces displayed on a mobile device in connection with a cryptocurrency-backed line of credit approval event.
Figure 2B:
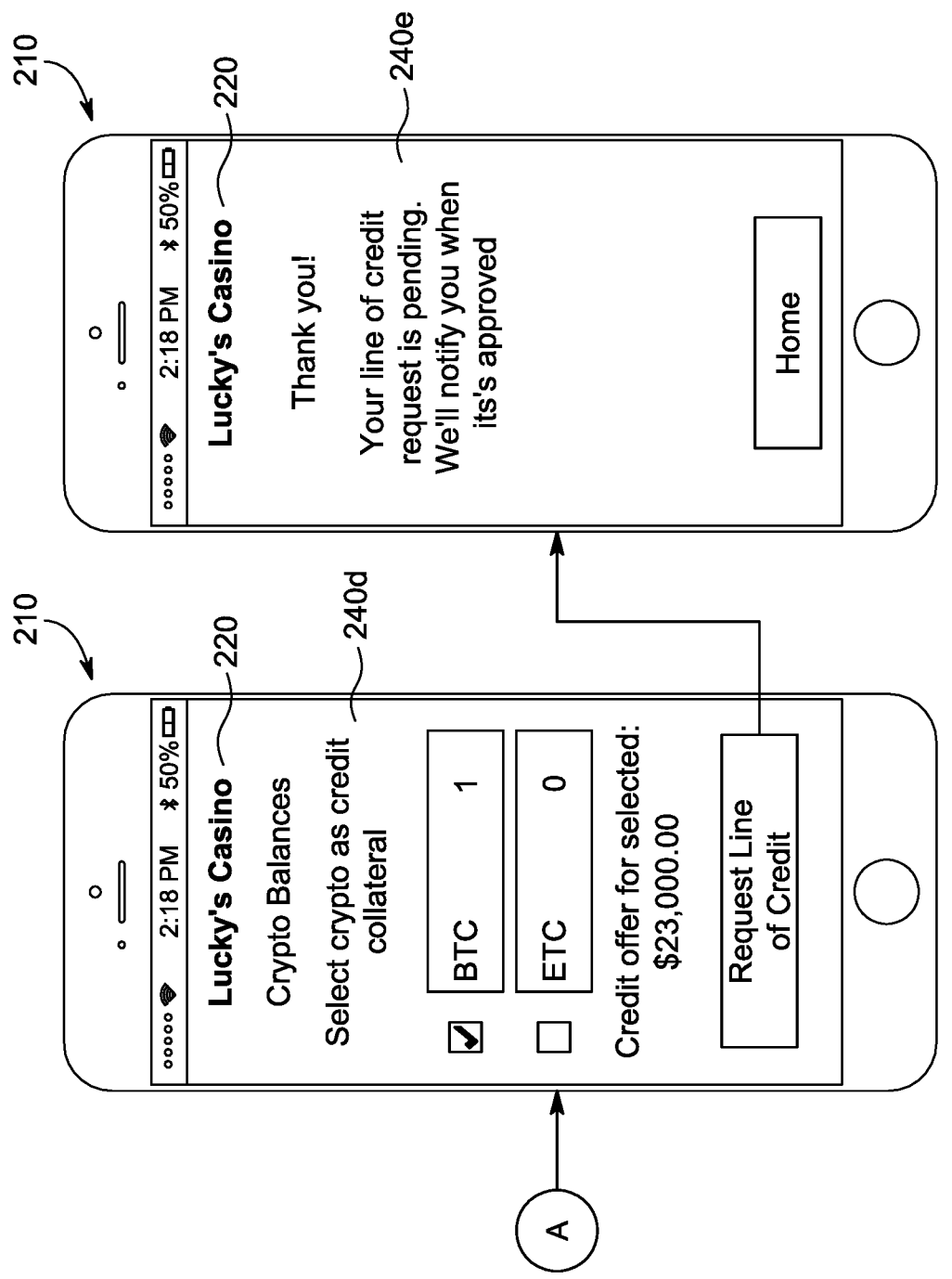

In certain embodiments, following a transfer of an amount of cryptocurrency into the gaming establishment controlled custodian account associated with the user, the user can request a line of credit backed by the amount of cryptocurrency held in the gaming establishment controlled custodian account associated with the user. In one embodiment, the user requests a line of credit associated with collateral of an amount of cryptocurrency held in their gaming establishment controlled custodian account via one or more interfaces, such as a website or a mobile device application. For example, FIG. 2B illustrates a sequence of messages displayed via a mobile device application 220 of a mobile device 210 in which after the user authenticates themselves via their gaming establishment credentials (not shown), the mobile device application 220 displays a first message 240a to the user identifying one or more current balances of one or more accounts and/or lines of credit or markers, and user-selectable options to apply for a marker, inquire about one or more existing markers and/or spend one or more balances of one or more accounts. Responsive to the user selecting the user-selectable option to apply for a marker, the mobile device application 220 displays a second message 240b to the user identifying different marker types available for the user to select. In this example, after selecting a crypto-backed marker, the mobile device application 220 displays a third message 240c to the user identifying the options of viewing one or more cryptocurrency balances, transferring an amount of cryptocurrency to the gaming establishment controlled custodian account or applying for a marker. Following the user's selection to apply for a marker, the mobile device application 220 displays a fourth message 240d to the user illustrating the different amounts of cryptocurrency held in the gaming establishment controlled custodian account associated with the user and enabling the user to select one or more of such held cryptocurrency as collateral for the line of credit. In this example, following the user selecting the bitcoin held in the gaming establishment controlled custodian account associated with the user to be used as collateral for the line of credit, the system determines an amount of the line of credit available. In this example, following the user making one or more inputs to request the line of credit, the mobile device application 220 displays a fifth message 240e to the user informing the user that the line of credit request is pending and the user will be notified when the line of credit is approved.

In another embodiment, the system enables the user to request a line of credit backed by an amount of cryptocurrency held in the gaming establishment controlled custodian account associated with the user via interactions with gaming establishment personnel, such as in person, over the phone and/or via SMS/test or email. In such an embodiment, when interacting with gaming establishment personnel, in association with requesting a line of credit backed by an amount of cryptocurrency held in a gaming establishment controlled custodian account associated with the user, the user identifies themselves to gaming establishment personnel, such as by presenting an identifier of a gaming establishment patron management system (e.g., a player tracking card in physical or virtual form) and/or presenting a government issued identification (e.g., a drivers license and/or passport). In another embodiment, the system employs a kiosk to assist the user in requesting a line of credit backed by an amount of cryptocurrency in the gaming establishment controlled custodian account. In this embodiment, the kiosk interacts with the user via a series of prompts to identify the cryptocurrency held in the gaming establishment controlled custodian account and enable the user to apply for the line of credit.

In certain embodiments, in association with linking one or more gaming establishment accounts associated with a user (e.g., a player tracking account and/or a gaming establishment fund management account, such as a cashless wagering account) with a gaming establishment controlled custodian account associated with the user, transferring an amount of cryptocurrency to the gaming establishment controlled custodian account associated with the user and/or requesting a line of credit backed by an amount of cryptocurrency held in the gaming establishment controlled custodian account associated with the user, the system requires the user to acknowledge and accept (manually and/or electronically) certain terms and conditions. Following such an acknowledgement and acceptance, the system notifies the user, via a message displayed at any suitable device, via an email, via an SMS or text message, a notification displayed by a mobile device application and/or in writing, the accepted terms and conditions associated with the transaction undertaken by the user.

It should be appreciated that while discussed as transferring an amount of cryptocurrency to the gaming establishment controlled custodian account associated with the user and requesting a line of credit backed by an amount of cryptocurrency held in the gaming establishment controlled custodian account associated with the user being two distinct user interactions, in certain embodiments, transferring an amount of cryptocurrency to the gaming establishment controlled custodian account associated with the user and requesting a line of credit backed by an amount of cryptocurrency held in the gaming establishment controlled custodian account associated with the user are combined as one user interaction. For example, as part of the process of discovering the destination blockchain address(s) that the user should transfer an amount of cryptocurrency to obtain a line of credit, the system enables the user to concurrently request a line of credit and inform the system of the amount of cryptocurrency they intend to transfer. In this example, the system may, optionally, present the user with an estimate of the amount of the line of credit available conditional on the cryptocurrency transfer succeeding.

In certain embodiments, since a gaming establishment supports a base currency (e.g., Dollars, Euros) for all transactions conducted at the gaming establishment that is different than the cryptocurrency, the system determines an amount of funds of the line of credit to make available to the user in the base currency of the gaming establishment. In these embodiments, the system determines the maximum amount of available funds of the line of credit based on one or more factors such as, but not limited to, the value of the cryptocurrency transferred to the gaming establishment controlled custodian account associated with the user, the requested amount of the line of credit, and/or one or more characteristics associated with the user, such as the user's prior line of credit activity, any currently outstanding lines of credit associated with the user, the user's wagering history, the user's creditworthiness, and/or the user's status. In other words, based on one or more properties or attributes associated with the cryptocurrency, the system determines an amount of available funds associated with the line of credit. In different embodiments, the different properties associated with the cryptocurrency include one or more of the type of cryptocurrency, the gaming establishment controlled custodian account holding the cryptocurrency, the amount of the cryptocurrency, the value of the cryptocurrency and/or a fee to hedge against price fluctuations of the cryptocurrency. It should be appreciated that unlike positing a traditional check (which has a static currency value) as collateral for a line of credit, since certain cryptocurrencies have a fluctuating market determined value (while other cryptocurrencies, such as stablecoins, may have a fixed value), the system performs a conversion process to convert the cryptocurrency funds to an amount of base currency of the gaming establishment and then determines, based on the properties or attributes associated with the underlying cryptocurrency (e.g., a volatility of the underlying cryptocurrency), an amount of funds of the line of credit to make available to the user.

In certain embodiments, if the transferred (or scheduled to be transferred) cryptocurrency is of a fluctuating value, the system determines to offer the user a line of credit less than or equal to the current market value of the cryptocurrency to be pledged. In different embodiments, the amount is a fixed percentage of the current market value of the cryptocurrency (e.g., 50% of the current market value of Bitcoin), and/or the amount is based on the type of cryptocurrency to be pledged as collateral (e.g., 50% of the current market value of Bitcoin and 25% of the current market value of Ethereum). In certain embodiments, the system (and/or an independent system, such as a contracted $3^{rd}$ party partner system) employs one or more market-based hedges to limit the underlying risk of cryptocurrency value fluctuations. In these embodiments, since such hedges have a cost, the system reduces the amount of credit available by the cost of these hedges or imposes a fee to cover such hedging costs at the time of the request of opening the line of credit or when an amount of funds from the line of credit are activated.

In certain embodiments, in view of the price fluctuations of the cryptocurrency held in the gaming establishment controlled custodian account, the system employs one or more risk management tools to limit the impact of fluctuations in the underlying cryptocurrency. For example, while a first group of gaming establishments employ very conservative line of credit offers given the historical volatility of the underlying cryptocurrency backing a line of credit, a second group of gaming establishments may take a more aggressive stance to offer users lines of credit closer to the value of their underlying cryptocurrency. For these second group of gaming establishments, the system enables the operators of such gaming establishments to manage risk by having a component monitor the underlying values of the cryptocurrencies that back a user's line of credit and alert the gaming establishment operator when one or more fluctuations in cryptocurrencies underlying a user's line of credit go past a "stop loss" threshold. In certain embodiments, when this occurs, the system may limit a user's further access to funds (or draw funds) from their line of credit. In other embodiments, the system modifies the timing when funds activated from the line of credit become due (e.g., funds are instantly due rather than being due in a week).

Figure 3:
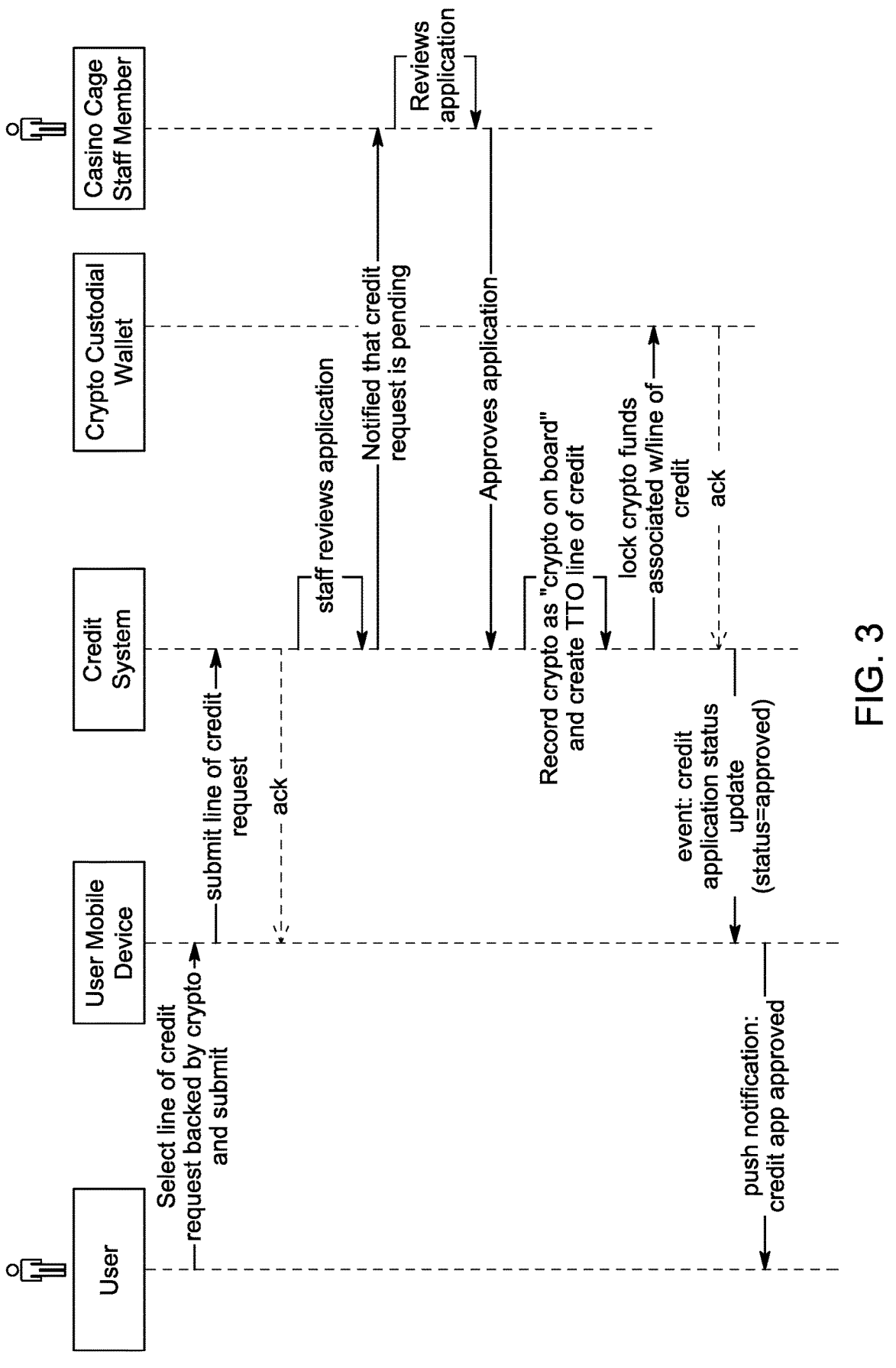
FIG. 3 is a flow chart of an example process for operating a system which employs an amount of cryptocurrency to establish a gaming establishment line of credit.

In certain embodiments, the system automatically approves or denies the requested line of credit backed by an amount of cryptocurrency transferred to a gaming establishment controlled custodian account associated with the user. In certain embodiments, the system automatically approves, denies or modifies one or more aspects of the requested line of credit backed by an amount of cryptocurrency transferred to a gaming establishment controlled custodian account associated with the user. In certain embodiments, the system interfaces with gaming establishment personnel in the approval or denial of the requested line of credit backed by an amount of cryptocurrency transferred to a gaming establishment controlled custodian account associated with the user. For example, as seen in FIG. 3 (which illustrates the described interactions between the user, the user's mobile device, the gaming establishment credit system, the gaming establishment controlled custodian account associated with the user, and gaming establishment personnel), certain embodiments of requesting a line of credit backed by an amount of cryptocurrency transferred to a gaming establishment controlled custodian account associated with a user involve the user requesting a line of credit using a mobile device, the gaming establishment credit system (i.e., the Credit System) operating with gaming establishment personnel (i.e., Casino Cage Staff Member) to approve the line of credit backed by cryptocurrency transferred to a gaming establishment controlled custodian account associated with the user (i.e., the Crypto Custodial Wallet). In certain embodiments, the system interfaces with gaming establishment personnel in the approval or denial or modification one or more aspects of the requested line of credit backed by an amount of cryptocurrency transferred to a gaming establishment controlled custodian account associated with the user. It should be appreciated that in different embodiments, the amount of involvement of gaming establishment personnel, if any, in approving, denying or modifying one or more requested lines of credits is based on one or more factors such as, but not limited to, the value of the cryptocurrency transferred to the gaming establishment controlled custodian account associated with the user, the requested amount of the line of credit, and/or one or more characteristics associated with the user, such as the user's prior line of credit activity, any currently outstanding lines of credit associated with the user, the user's wagering history, the user's creditworthiness, and/or the user's status.

In certain embodiments, since the amount of cryptocurrency transferred to the gaming establishment controlled custodian account associated with the user is pledged as collateral for the line of credit approved by the system, the system places a hold or lock on the pledged cryptocurrency balances held in the gaming establishment controlled custodian account associated with the user. Such an embodiment prevents the user from attempting to transfer those cryptocurrency balances out from the gaming establishment controlled custodian account associated with the user while the user has accessed an amount of funds from the line of credit. In certain such embodiments, the system automatically places the hold on the pledged cryptocurrency and the system removes the hold upon the amount of funds activated from the line of credit being paid back. In another embodiment, the system notifies gaming establishment personnel to ensure that the user has paid back all funds borrowed against one or more lines of credit before gaming establishment personnel will schedule or trigger the transfer out of cryptocurrency held in the gaming establishment controlled custodian account associated with the user.

In certain embodiments, following the approval of the line of credit backed by an amount of cryptocurrency transferred to a gaming establishment controlled custodian account associated with a user, the system updates one or more databases to record the amount of cryptocurrency pledged as cryptocurrency on hold. In certain embodiments, the system additionally adjusts the user's This Trip Only ("TTO") line of credit. It should be appreciated that the TTO line of credit represents a temporary or limited duration credit line related to a user's upcoming or current visit to a gaming establishment. Such a TTO line of credit may, in certain instances, be in addition to a user's other lines of credits available, such as a global line of credit for a user across all gaming establishment sites, and/or a local line of credit for a current gaming establishment site, and may be valid for a different duration of time than these other lines of credit available to the user.

In certain embodiments, in addition to any updating of any databases to reflect the approval of the cryptocurrency backed line of credit, the system enables the user to utilize any suitable interface to view information about one or more issued lines of credit (e.g., an available amount of funds associated with the issued line of credit and/or an amount of funds associated with the issued line of credit previously accessed) as well as the balance of zero, one or more gaming establishment accounts.

In certain embodiments, the system enables the user to make one or more inputs to access part or all of the line of credit backed by an amount of cryptocurrency transferred to a gaming establishment controlled custodian account associated with a user. In certain embodiments, the system employs a mobile device application to enable the user to input an amount of funds to be activated from a line of credit and transferred to a gaming establishment account, such as a cashless wagering account or a gaming establishment retail account. In certain embodiments, the system employs a kiosk to enable the user to input an amount of funds to be activated from a line of credit and transferred to a gaming establishment account, such as a cashless wagering account or a gaming establishment retail account. In certain embodiments, the system employs a mobile device application to enable the user to input an amount of funds to be activated from a line of credit and transferred to a gaming device, such as to a credit meter of an EGM or to a gaming table component to be exchanged for an amount of gaming table chips. In certain embodiments, the system employs an interface of a gaming device (such as an externally controlled service window displayed by a gaming device) to enable the user to input an amount of funds to be activated from a line of credit and transferred to the gaming device, such as to a credit meter of an EGM or to a gaming table component to be exchanged for an amount of gaming table chips.

In certain embodiments, the gaming device interface, kiosk interface, and/or mobile device application enables the user to select an amount of funds to be transferred from a listing of available amounts of funds to be transferred to the gaming device. In different embodiments, the listing of available amounts to be transferred is previously selected by the user, selected by a gaming establishment or selected by a third-party. In certain embodiments, the gaming device interface, kiosk interface, and/or mobile device application enables the user, a gaming establishment and/or a third-party to modify the listing of available amount of funds. In another embodiment, the gaming device interface, kiosk interface, and/or mobile device application determines the listing of available amount of funds based on one or more characteristics associated with the user, such as the user's prior amounts transferred, the user's wagering history, and/or the user's status. In another embodiment, the gaming device interface, kiosk interface, and/or mobile device application determines the listing of available amount of funds based on one or more characteristics associated with the gaming device, such as based on the denomination, game type, minimum bet and/or maximum available wager amount of the gaming device. In certain embodiments wherein the gaming device includes a gaming table component, the gaming device interface, kiosk interface, and/or mobile device application enables the user to specify an amount of gaming chips, such as three red chips and five blue chips. In these embodiments, the gaming device and/or mobile device application converts the requested amount of gaming chips to an amount of funds to be transferred to the gaming table component.

In certain embodiments, to complete a transfer of an amount of funds associated with a line of credit backed by an amount of cryptocurrency held in a gaming establishment controlled custodian account, the gaming establishment credit system determines whether to authorize the activation of the amount of funds from the issued line of credit. For example, following a component of a gaming establishment fund management system querying the component of the gaming establishment credit system for a requested amount of funds to be accessed from the line of credit and transferred to a gaming establishment account maintained for a user, the component of the gaming establishment credit system determines whether any issued lines of credit may be accessed to complete the requested transaction.

If the component of the credit system determines not to authorize the transfer of the amount of funds to be accessed from the issued line of credit of the user, the system communicates data denying the request of funds accessed from the issued line of credit of the user. Without access to the funds from the line of credit of the user, the system communicates a denial of the requested transfer of funds to the gaming device, kiosk and/or the mobile device application, wherein the gaming device, kiosk and/or mobile device application display a denial of funds transfer to the user. In these embodiments, if the component of the credit system determines that the user has an issued line of credit but the amount of funds available from the issued line of credit are inadequate to cover the requested amount of funds, the system does not proceed with the transfer of the requested amount of funds accessed from the line of credit.

In certain embodiments, if the component of the gaming establishment credit system determines to authorize the transfer the amount of funds to be accessed from the issued line of credit of the user, the component of the gaming establishment credit system completes the transfer of the requested amount of funds. In these embodiments, if the gaming establishment credit system determines to authorize the activation of the amount of funds from the issued line of credit, the gaming establishment credit system updates the amount available of the issued line of credit (to reflect the amount drawn from the line of credit) and communicates an authorization of the amount of funds to the requesting component of the system. For example, upon receiving the authorization, the gaming establishment fund management system updates a balance of a gaming establishment account by the amount of funds activated from the line of credit.

In certain embodiments, rather than using a mobile device, kiosk and/or a gaming device interface to access an amount of funds of a line of credit backed by an amount of cryptocurrency, the system enables gaming establishment personnel to interface with the user to access the amount of funds of the line of credit. For example, the system enables a user situated at a gaming table an opportunity to interact with gaming establishment personnel to sign a marker slip in exchange for an amount of gaming chips. In another example, the system enables a user to interact with gaming establishment personnel at a gaming establishment interface, such as a casino cage, to sign a marker slip in exchange for an amount of gaming chips, cash and/or a cashless ticket voucher associated with an amount of funds.

It should be appreciated that certain jurisdictional regulations and/or gaming establishment policies require the user to approve a transaction to access the funds on their issued line of credit. In one such embodiment, the user acknowledges the approval of accessing the issued line of credit, when needed, by entering a personal identification number ("PIN") via the mobile device application, providing a signature and/or presenting a biometric identifier to the mobile device. In another embodiment, the user acknowledges the approval of accessing the issued line of credit, when needed, by entering a PIN, providing a signature and/or presenting a biometric identifier to the EGM or a peripheral device associated with the EGM, such as a display device or input device associated with a SMIB in communication with the EGM.

Figure 4:
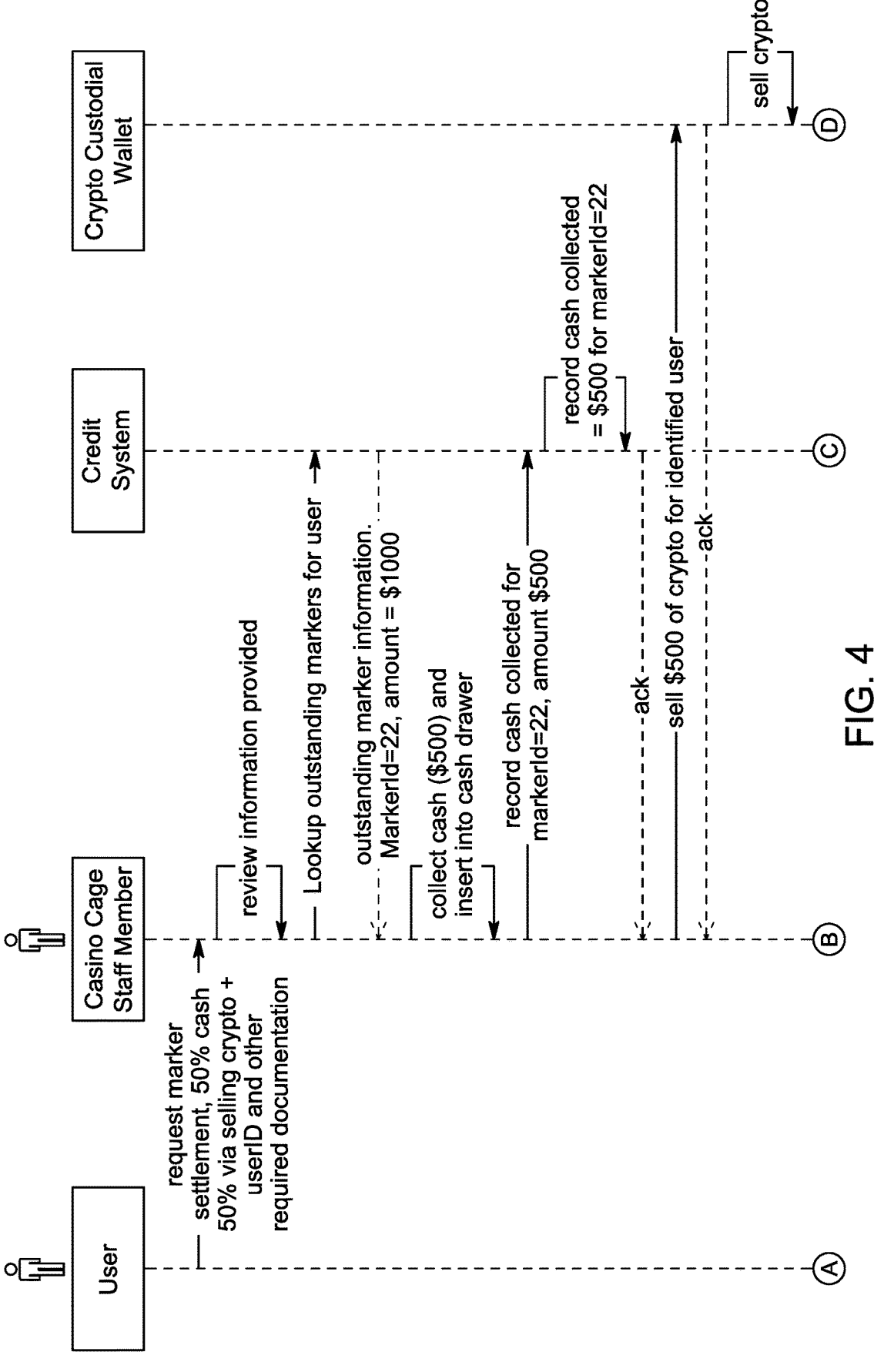
FIG. 4 is a flow chart of an example process for operating a system which employs an amount of cryptocurrency to settle an amount owed on a gaming establishment line of credit.
Figure 4:
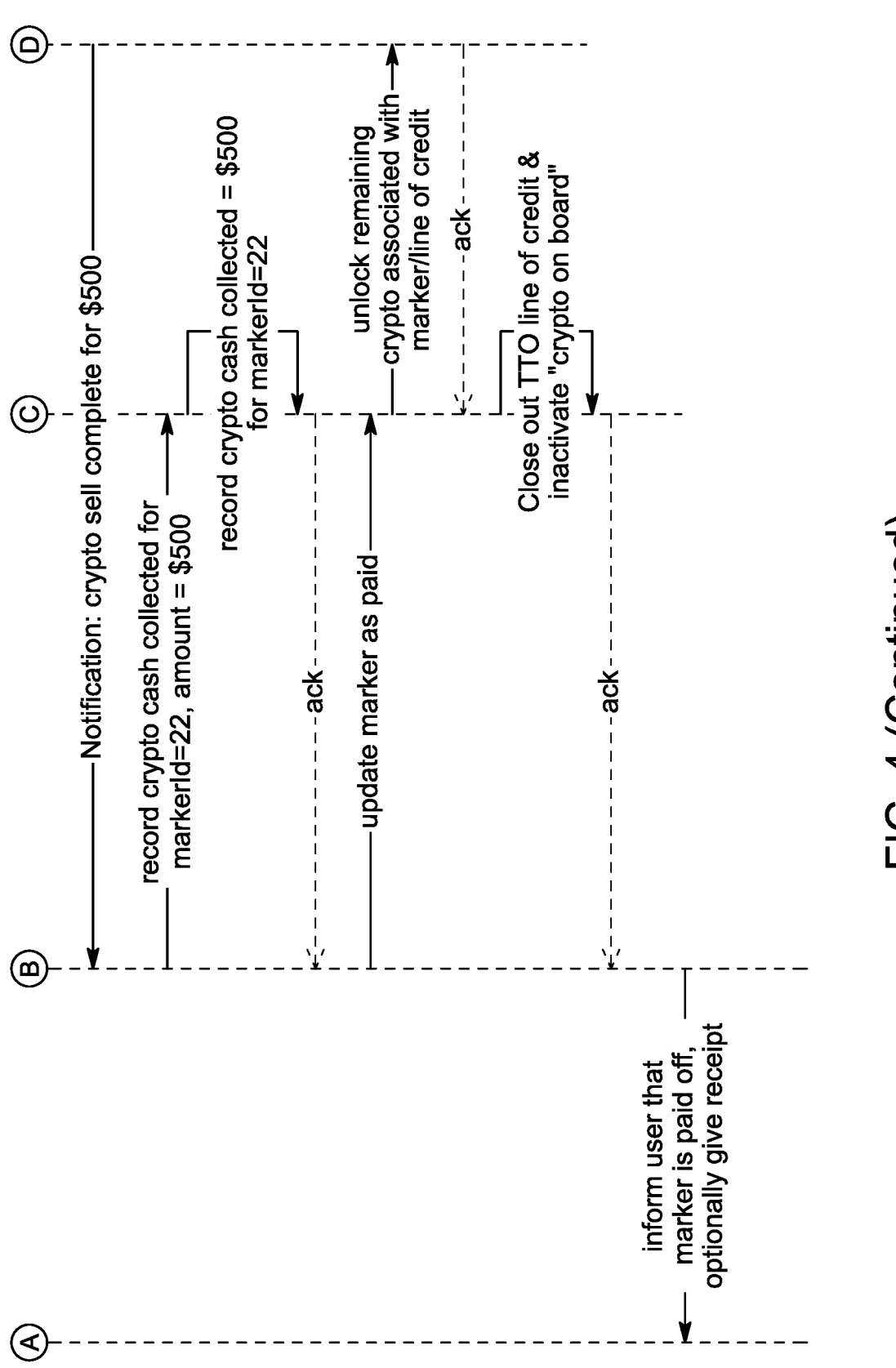

In certain embodiments, when a user pays off a line of credit backed by cryptocurrency held in a gaming establishment controlled custodian account associated with the user, the user has a choice on how to pay the line of credit. In certain such embodiments, the system enables the user to pay off the line of credit with an amount of funds held, such as cash funds or funds held in one or more gaming establishment accounts. For example, if one or more gaming sessions of the user resulted in the user realizing an amount of winnings, then at (or prior to) when the amount of funds borrowed against the line of credit are due, the system enables the user to pay off the amount of debt owed on the line of credits using such gains (held as cash or funds in the user's gaming establishment fund management account). In certain other embodiments, the system enables the user to pay off the line of credit with part or all of the amount of cryptocurrency held in the gaming establishment controlled custodian account associated with the user. For example, if the user incurred losses, then at (or prior to) when the amount of funds borrowed against the line of credit are due, the system deducts an amount equal to the loss (plus any transaction fees (if any)) from the user's escrowed amount of cryptocurrency. In certain other embodiments, the system enables the user to pay off the line of credit with a combination of an amount of funds held, such as cash funds or funds held in one or more gaming establishment accounts plus part or all of the amount of cryptocurrency held in the gaming establishment controlled custodian account associated with the user. For example, as seen in FIG. 4 (which illustrates the described interactions between the user, the gaming establishment credit system, the gaming establishment controlled custodian account associated with the user, and gaming establishment personnel), certain embodiments of paying back an amount of funds owed on a line of credit backed by an amount of cryptocurrency transferred to a gaming establishment controlled custodian account associated with a user involve the user requesting settlement of a line of credit with a combination of funds provided to gaming establishment personnel (i.e., Casino Cage Staff Member) and the held cryptocurrency. In this example, the gaming establishment credit system (i.e., the Credit System) operates to sell part of the held cryptocurrency in paying off the line of credit backed by cryptocurrency transferred to a gaming establishment controlled custodian account associated with the user (i.e., the Crypto Custodial Wallet).

It should be appreciated that any suitable interface may be employed to facilitate the paying off of a line of credit backed by an amount of cryptocurrency held in a gaming establishment controlled custodian account associated with a user. In certain embodiments, the system employs a mobile device application to enable the user to pay back part or all of an amount of funds activated from a line of credit. In certain embodiments, the system employs a kiosk to enable the user to pay back part or all of an amount of funds activated from a line of credit. In certain embodiments, the system employs an interface of a gaming device (such as an externally controlled service window displayed by a gaming device) to enable the user to pay back part or all of an amount of funds activated from a line of credit. In these different embodiments, the system enables the user to deposit cash, cashless ticket vouchers, and/or casino chips to perform the cash settlement portion of the overall settlement process.

It should be further appreciated that since, in certain instances, an amount of cryptocurrency held in a gaming establishment controlled custodian account may be sold to cover part or all of the amount of funds owed on a line of credit backed by such an amount of cryptocurrency, in certain embodiments, the system accounts for any taxes owed in association with this sale transaction. In these embodiments, the system tracks sales or liquidations of cryptocurrency so that liquidations can be reported to tax authorities using the required forms. In another embodiment, the system tracks all cryptocurrency sales or liquidations and reports to the user the possible tax consequences of their cryptocurrency sales (e.g., via mailing or electronically delivering the appropriate tax form). In certain embodiments, the system imposes a fee on one or more sales or liquidations (which reduce the amount of funds that can be applied to pay off the line of credit) but may qualify as a deductible expense on the appropriate tax form.

In certain embodiments, since the amount of cryptocurrency transferred to the gaming establishment controlled custodian account associated with the user is pledged as collateral for the line of credit approved by the system, following the paying off of the amount of funds activated from the line of credit, the system removes the hold or lock on the pledged cryptocurrency balances held in the gaming establishment controlled custodian account associated with the user. Such an embodiment enables the user to then request a transfer of those cryptocurrency balances out from the gaming establishment controlled custodian account associated with the user. In certain such embodiments, the system automatically removes the hold upon the amount of funds activated from the line of credit being paid back. In another embodiment, the system notifies gaming establishment personnel to remove the hold upon the amount of funds activated from the line of credit being paid back.

In certain embodiments, once the user has settled an amounts owed on the line of credit backed by the amount of cryptocurrency held in the gaming establishment controlled custodian account associated with the user and any holds or locks have been removed, the system enables the user to request a transfer of the cryptocurrency from the gaming establishment controlled custodian account to an external account (e.g., an external cryptocurrency account) associated with the user. In certain such embodiments, the user initiates the transfer-out of cryptocurrency funds from the gaming establishment controlled custodian account to their external cryptocurrency account by providing the destination account identifier associated with their external cryptocurrency account.

Figure 2C:
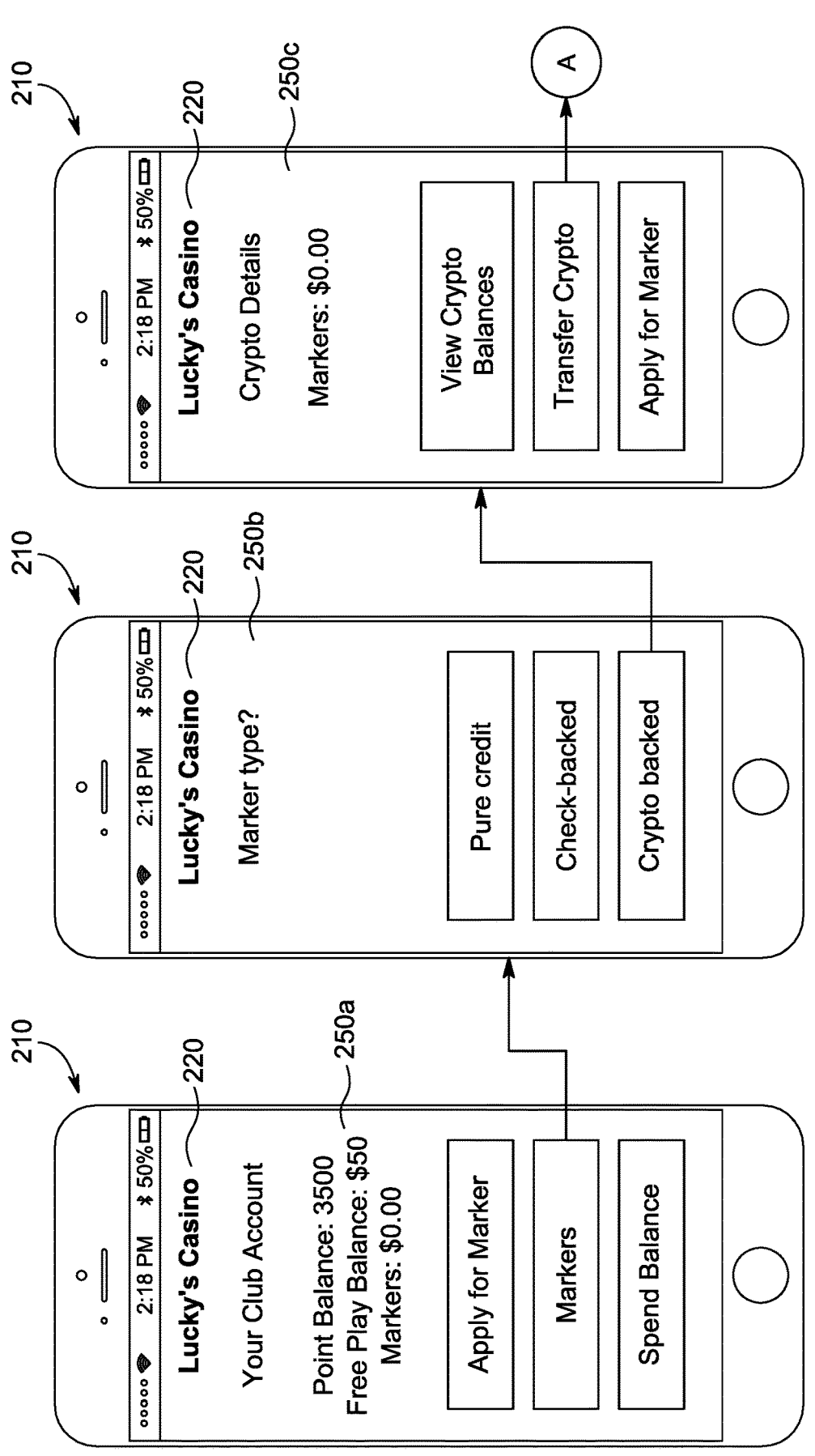
FIG. 2C is an example sequence of graphical user interfaces displayed on a mobile device in connection with a cryptocurrency from gaming establishment custodial account transfer event.
Figure 2C:
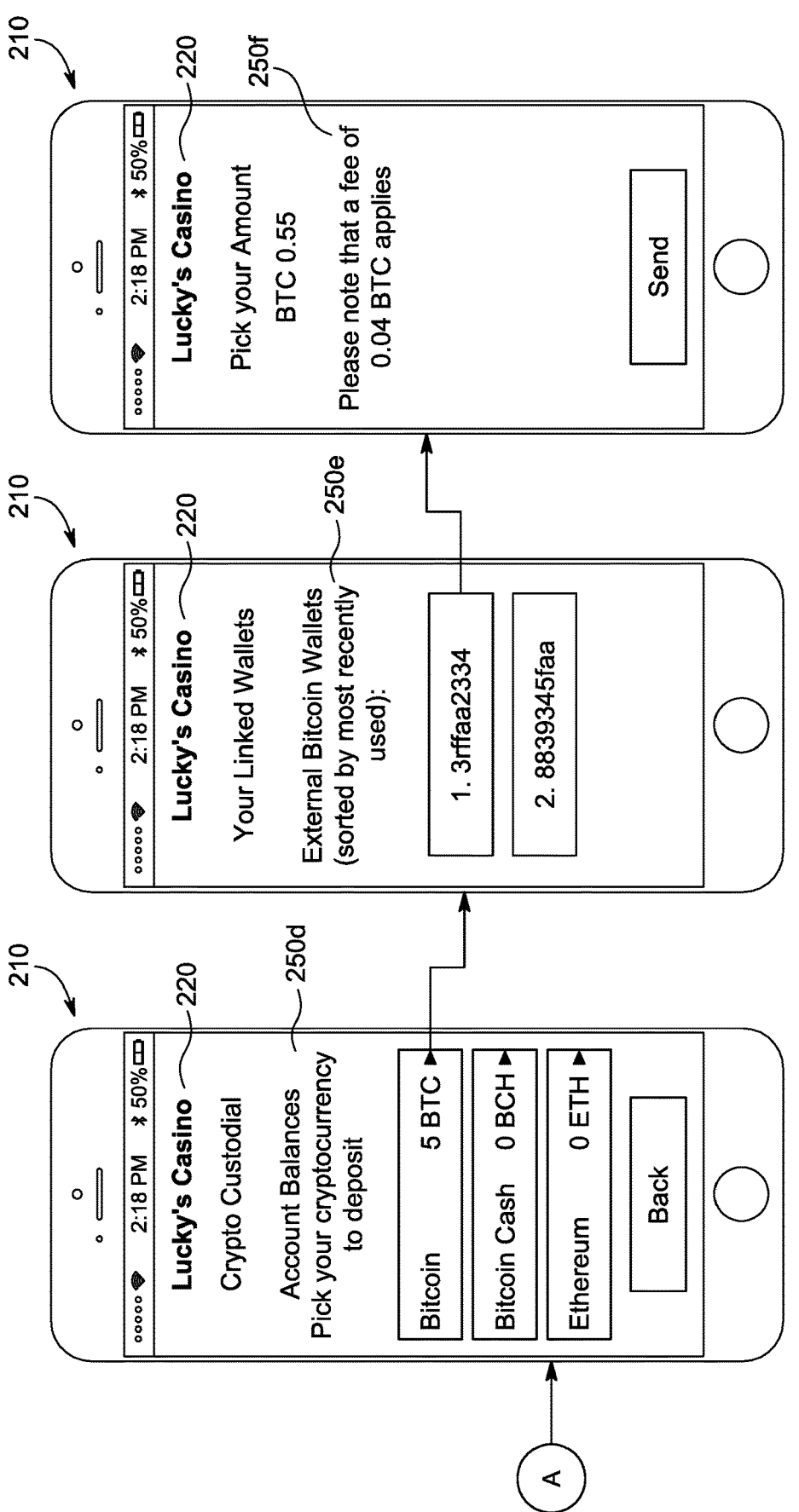

In certain embodiments, the system enables the user to request a transfer-out of cryptocurrency funds from the gaming establishment controlled custodian account via interactions with gaming establishment personnel, such as in person, over the phone and/or via SMS/test or email. In another embodiment, the system employs a kiosk to assist the user in requesting a transfer-out of cryptocurrency funds from the gaming establishment controlled custodian account. In another embodiment, the system enables the user to request a transfer-out of cryptocurrency funds from the gaming establishment controlled custodian account via a mobile device application running on their mobile device. For example, FIG. 2C illustrates a sequence of messages displayed via a mobile device application 220 of a mobile device 210 in which after the user authenticates themselves via their gaming establishment credentials (not shown), the mobile device application 220 displays a first message 250a to the user identifying one or more current balances of one or more accounts and/or lines of credit or markers, and user-selectable options to apply for a marker, inquire about one or more existing markers and/or spend one or more balances of one or more accounts. Responsive to the user selecting the user-selectable option associated with a marker, the mobile device application 220 displays a second message 250b to the user identifying different marker types available for the user to select. In this example, after selecting a crypto-backed marker, the mobile device application 220 displays a third message 250c to the user identifying the options of viewing one or more cryptocurrency balances, transferring an amount of cryptocurrency to the gaming establishment controlled custodian account or applying for a marker. Following the user's selection to transfer an amount of cryptocurrency held in the gaming establishment controlled custodian account, the mobile device application 220 displays a fourth message 250d to the user illustrating the different amounts of cryptocurrency held in the gaming establishment controlled custodian account associated with the user and enabling the user to select one or more of such held cryptocurrency. In this example, following the user selecting the bitcoin held in the gaming establishment controlled custodian account associated with the user to be transferred to a selected external bitcoin wallet 250e, the mobile device application 220 displays a message 250f to the user confirming the amount to be transferred and informing the user of any applicable fee amount.

In certain embodiments, the system saves the destination accounts (and/or destination account identifiers) provided by the user during previous transaction requests (i.e., requests to deposit cryptocurrency funds or requests to withdraw cryptocurrency funds). By saving the previously provided destination or receiving accounts, the user does not need to enter the address each time they initiate a cryptocurrency funds withdrawal. In certain embodiments, the system limits the destination accounts that the user may enter to those external cryptocurrency accounts from which the user previously initiated a cryptocurrency funds deposit.

In certain embodiments, the system enables the user to verify that they own the external cryptocurrency account. For example, the system generates random information (i.e., a timestamp, nonce) that the user signs with the private key associated with the external cryptocurrency account. In certain other embodiments, the system prompts the user to transmit a blank transaction request, a transaction request for zero funds, or a transaction request for a trivial amount of funds between the gaming establishment controlled custodian account and the user's external cryptocurrency account within a designated period to verify that the user owns the external cryptocurrency account. In certain such embodiments, the system determines, such as randomly determines, the trivial amount of funds to include in the transaction request. In certain other embodiments, the system provides the user information (i.e., random data) to include in the transaction request. In certain such embodiments, once the transaction request is verified (e.g., by a quorum of miners of the corresponding cryptocurrency blockchain network), the user uses the corresponding external cryptocurrency account for performing subsequent withdrawals from the gaming establishment controlled custodian account associated with the user.

In certain embodiments, in addition to or alternative from limiting the transfer of an amount of cryptocurrency back to the original external cryptocurrency account associated with a user, the system employs one or more controls or limits to safeguard users and/or the gaming establishment. In one such embodiment, transfers of an amount of cryptocurrency into a gaming establishment controlled custodian account associated with a user are initially put into a pending state until the system (and/or gaming establishment personnel) validate certain data associated with the user, such as validating Know Your Customer data presented by a user and/or validating that the user is not on any criminal watchlists, or politically exposes persons lists. In another such embodiment, transfers of an amount of cryptocurrency into a gaming establishment controlled custodian account associated with a user are additionally or alternatively initially put into a pending state until the addresses from which the cryptocurrency originated can be validated to not be associated with (or chain to) any blockchain addresses associated with criminal activity or an address or service that attempts to hide the historical activity of cryptocurrency (such as certain mixing services). In another embodiment, the system imposes one or more transfer limits associated with an amount and/or frequency of transfer per period of time. For example, the system enforces daily, weekly, monthly, and/or yearly transfer-in and/or transfer-out limits. In certain embodiments, the transfer limitations are the same for all users. In certain embodiments, the transfer limitations vary based upon the profile of the user, such as what government identification they produced to validate their identity. In certain embodiments, one or more of these limits may be overridden or changed by gaming establishment personnel. In other embodiments, one or more of these limits are set are may not be overridden or changed.

In various embodiments, withdrawal of funds from a gaming establishment controlled custodian account are subject to a transaction fee imposed by the gaming establishment and/or the cryptocurrency blockchain network. In certain embodiments, the transaction fee is a variable transaction fee that is adjusted by the gaming establishment based on characteristics associated with the user, such as their total spend, their user rank, and/or their point balance. In certain embodiments, the user pays the transaction fee using funds from a different account of the gaming establishment fund management account. That is, if a transaction fee of a portion of a bitcoin is incurred by the user for withdrawing funds from the gaming establishment controlled custodian account to their external bitcoin account, the user may pay the transaction fee in bitcoins or using a different funding option, such as funds from a cashless wagering account of the gaming establishment fund management account, points, and/or comps.

Accordingly, in view of the accepted uses of cryptocurrency funds in commerce, the systems and method of the present disclosure enable a user's cryptocurrency to be utilized as collateral for one or more lines of credit without potentially missing out on any appreciation of the cryptocurrency while such cryptocurrency is held in a gaming establishment controlled cryptocurrency custodian account. Such a configuration thus enhances the user's gaming establishment experience by providing access to funds based on cryptocurrency holdings that certain users prefer. In doing so, the system provides that digital or virtual currencies are usable as collateral at a gaming establishment in the same fashion that other forms of collateral, such as a paycheck held at a casino cage, may be used as collateral at a gaming establishment.

In various embodiments, in addition to funding a gaming establishment account with funds obtained via a line of credit backed by an amount of cryptocurrency held in a gaming establishment controlled custodian account, the system enables one or more gaming establishment accounts to be funded from one or more sources. In certain embodiments, the system enables the gaming establishment account to be directly funded from one or more of such sources. In certain embodiments, the system enables the gaming establishment account to be indirectly funded from one or more of such sources, such as by an amount of funds from such sources first being transferred to another gaming establishment account and then such an amount of funds being transferred from the other gaming establishment account to the gaming establishment account.

In certain embodiments, the gaming establishment account is associated with one or more external accounts, such as one or more credit card accounts, one or more debit card accounts and/or one or more third-party maintained accounts (e.g., one or more PayPal® accounts or Venmo® accounts). In certain embodiments, the gaming establishment account is associated with a gaming establishment or a group of gaming establishments, wherein the user establishes a gaming establishment account by a deposit of funds (such as at a kiosk) to be subsequently utilized in association with the mobile device application. In other embodiments, the gaming establishment account is funded via a mobile device electronic fund transfer, such using Apple Pay™ or Android Pay™. It should be appreciated that in different embodiments, the system utilizes a mobile device running a mobile device application, a kiosk, an EGM, a gaming table component, a service window displayed by a gaming device (e.g., a remote host controlled service window displayed by an EGM) and/or a gaming establishment interface to facilitate the transfer of funds from a third-party account. In certain embodiments, the system enables funds to be deposited in a gaming establishment account via activating a line of credit associated with the user.

In certain embodiments, the system enables funds to be deposited in a gaming establishment account, via a gaming device, such as an EGM and/or via a non-gaming device, such as a kiosk. In certain embodiments, the system enables a user that has an amount of cash to utilize a gaming device and/or a non-gaming device to convert the cash to an amount deposited into a gaming establishment account (which may be subsequently transferred utilizing a mobile device application). In other embodiments, the system enables funds to be deposited in a gaming establishment account via a gaming device and/or a non-gaming device that accepts printed ticket vouchers. In these embodiments, the system enables a user that has one or more printed ticket vouchers to utilize a gaming device and/or a non-gaming device to convert the printed ticket voucher to an amount deposited into a gaming establishment account (which may be subsequently transferred utilizing a mobile device application).

In certain embodiments, the system enables funds to be deposited in a gaming establishment account via a gaming establishment interface, such as a gaming establishment cage or desk. In certain embodiments, the system enables a user that has an amount of cash to utilize a gaming establishment interface, such as a gaming establishment cage or desk to convert the cash to an amount deposited into a gaming establishment account (which may be subsequently transferred utilizing a mobile device application). In other embodiments, the system enables funds to be deposited in a gaming establishment account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment account (which may be subsequently transferred utilizing a mobile device application).

In certain embodiments, the gaming establishment account is associated with funds associated with one or more virtual ticket vouchers. In certain embodiments, the system enables a user associated with an amount of virtual ticket vouchers to utilize a gaming device (e.g., an EGM, or a component of an EGM), a non-gaming device (e.g., a kiosk), a mobile device running a mobile device application, and/or a gaming establishment interface to convert the virtual ticket vouchers to an amount deposited into a gaming establishment account.

It should be further appreciated that any functionality or process of the present disclosure may be implemented via one or more servers (associated with or independent of any component of any system disclosed herein), a mobile device application, one or more gaming establishment devices (e.g., a gaming device such as an EGM or a non-gaming device such as a kiosk or a point-of-sale terminal of a retailer located within or otherwise associated with a gaming establishment), and/or one or more components of a gaming establishment system (such as a component of a gaming establishment management system supported by or otherwise located inside a gaming establishment device and/or a non-gaming establishment device). Accordingly: (i) while certain functions, features or processes are described herein as being performed by a non-gaming establishment device, such functions, features or processes may alternatively be performed by one or more servers, or one or more mobile device applications, one or more gaming establishment devices, and/or one or more gaming establishment components, and (ii) while certain functions, features or processes are described herein as being performed by one or more servers (e.g., a server of a gaming establishment fund management system), such functions, features or processes may alternatively be performed by one or more gaming establishment devices, one or more components of a gaming establishment system, one or more non-gaming establishment devices, one or more mobile device applications, or one or more gaming establishment components.

In certain embodiments, the above-described embodiments of the present disclosure may be implemented in accordance with or in conjunction with zero, one or more components of a gaming establishment fund management system (e.g., a cashless wagering system or a gaming establishment retail system); zero, one or more components of a gaming establishment credit system; and/or zero, one or more gaming establishment devices. In these embodiments, such components of the gaming establishment fund management system, the gaming establishment credit system, and/or the gaming establishment device each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the gaming establishment fund management system, the component of the gaming establishment credit system, and/or the gaming establishment device; (3) accessing memory to configure or reconfigure parameters in the memory according to indicia read from the component of the gaming establishment fund management system, the component of the gaming establishment credit system, and/or the gaming establishment device; (4) communicating with interfaces and the peripheral devices (such as input/output devices); and/or (5) controlling the peripheral devices. In certain embodiments, one or more components of the controller (such as the at least one processor) reside within a housing of the component of the gaming establishment fund management system, the component of the gaming establishment credit system, and/or the gaming establishment device, while in other embodiments, at least one component of the controller resides outside of the housing of the component of the gaming establishment fund management system, the component of the gaming establishment credit system, and/or the gaming establishment device.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMS, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the gaming establishment fund management system, the component of the gaming establishment credit system, and/or the gaming establishment device disclosed herein. In certain embodiments, the at least one memory device resides within the housing of the component of the gaming establishment fund management system, the component of the gaming establishment credit system, and/or the gaming establishment device, while in other embodiments at least one component of the at least one memory device resides outside of the housing of the component of the gaming establishment fund management system, the component of the gaming establishment credit system, and/or the gaming establishment device. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the gaming establishment fund management system, the component of the gaming establishment credit system, and/or the gaming establishment device; (2) associations between configuration indicia read from the component of the gaming establishment fund management system, the component of the gaming establishment credit system, and/or the gaming establishment device with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the gaming establishment fund management system, the component of the gaming establishment credit system, and/or the gaming establishment device to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the gaming establishment fund management system, the component of the gaming establishment credit system, and/or the gaming establishment device to control the component of the gaming establishment fund management system, the component of the gaming establishment credit system, and/or the gaming establishment device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a component of the gaming establishment fund management system to implement at least part of the present disclosure. In other embodiments, part or all of the program code and/or the operating data is downloaded to the at least one memory device of the component of the gaming establishment fund management system, the component of the gaming establishment credit system, and/or the gaming establishment device through any suitable data network described above (such as an Internet or intranet).

The at least one memory device also stores a plurality of device drivers. Examples of different types of device drivers include device drivers for the component of the gaming establishment fund management system, the component of the gaming establishment credit system, and/or the gaming establishment device and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the gaming establishment fund management system, the component of the gaming establishment credit system, and/or the gaming establishment device. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the gaming establishment fund management system, the component of the gaming establishment credit system, and/or the gaming establishment device loads the new device driver from the at least one memory device to enable communication with the new device. For instance, one type of card reader in the component of the gaming establishment fund management system, the component of the gaming establishment credit system, and/or the gaming establishment device can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the component of the gaming establishment fund management system, the component of the gaming establishment credit system, and/or the gaming establishment device and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

The at least one output device includes at least one display device configured to display any suitable information. In certain embodiments, the display devices are connected to or mounted on a housing of the component of the gaming establishment fund management system, the component of the gaming establishment credit system, and/or the gaming establishment device. In various embodiments, the display devices serve as digital glass configured to aspects of the gaming establishment in which the component of the gaming establishment fund management system, the component of the gaming establishment credit system, and/or the gaming establishment device is located. In various embodiments, the component of the gaming establishment fund management system, the component of the gaming establishment credit system, and/or the gaming establishment device includes zero, one or more of the following display devices:

(a) a central display device; (b) a player tracking display configured to display various information regarding a user's player tracking status; (c) a secondary or upper display device in addition to the central display device and the player tracking display; (d) a credit display configured to display a current quantity of credits, amount of cash, account balance, or the equivalent; and (e) a bet display. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In various embodiments, the at least one output device includes a payout device. In these embodiments, after the component of the gaming establishment fund management system, the component of the gaming establishment credit system, and/or the gaming establishment device receives an actuation, the component of the gaming establishment fund management system, the component of the gaming establishment credit system, and/or the gaming establishment device causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

In certain embodiments, the at least one output device is a sound generating device controlled by one or more sound cards. In one such embodiment, the sound generating device includes one or more speakers or other sound generating hardware and/or software configured to generate sounds, such as by playing music. In another such embodiment, the component of the gaming establishment fund management system, the component of the gaming establishment credit system, and/or the gaming establishment device provides dynamic sounds coupled with attractive multimedia images displayed on one or more of the display devices to provide an audio-visual representation or to otherwise display full-motion video with sound to attract users to the component of the gaming establishment fund management system, the component of the gaming establishment credit system, and/or the gaming establishment device. In certain embodiments, the component of the gaming establishment fund management system, the component of the gaming establishment credit system, and/or the gaming establishment device displays a sequence of audio and/or visual attraction messages during idle periods to attract potential users to the component of the gaming establishment fund management system, the component of the gaming establishment credit system, and/or the gaming establishment device. The videos may be customized to provide any appropriate information.

The at least one input device may include any suitable device that enables an input signal to be produced and received by the at least one processor of the component of the gaming establishment fund management system, the component of the gaming establishment credit system, and/or the gaming establishment device. In one embodiment, the at least one input device includes a payment device configured to communicate with the at least one processor of the component of the gaming establishment fund management system, the component of the gaming establishment credit system, and/or the gaming establishment device to fund the component of the gaming establishment fund management system, the component of the gaming establishment credit system, and/or the gaming establishment device. In certain embodiments, the payment device includes zero, one or more of: (a) a bill acceptor into which paper money is inserted; (b) a ticket acceptor into which a ticket or a voucher is inserted; (c) a reader or a validator for credit cards, debit cards, or credit slips into which a credit card, debit card, or credit slip is inserted; (d) a player identification card reader into which a player identification card is inserted; or (e) any suitable combination thereof. In one embodiment, the at least one input device includes a payment device configured to enable the component of the gaming establishment fund management system, the component of the gaming establishment credit system, and/or the gaming establishment device to be funded via an electronic funds transfer, such as a transfer of funds from a bank account. In another embodiment, the component of the gaming establishment fund management system, the component of the gaming establishment credit system, and/or the gaming establishment device includes a payment device configured to communicate with a mobile device of a user, such as a mobile phone, a radio frequency identification tag, or any other suitable wired or wireless device, to retrieve relevant information associated with that user to fund the component of the gaming establishment fund management system, the component of the gaming establishment credit system, and/or the gaming establishment device. When the component of the gaming establishment fund management system, the component of the gaming establishment credit system, and/or the gaming establishment device is funded, the at least one processor determines the amount of funds entered and displays the corresponding amount.

In various embodiments, the at least one input device includes a plurality of buttons that are programmable by the component of the gaming establishment fund management system, the component of the gaming establishment credit system, and/or the gaming establishment device operator to, when actuated, cause the component of the gaming establishment fund management system, the component of the gaming establishment credit system, and/or the gaming establishment device to perform particular functions. For instance, such buttons may be hard keys, programmable soft keys, or icons icon displayed on a display device of the component of the gaming establishment fund management system, the component of the gaming establishment credit system, and/or the gaming establishment device that are actuatable via a touch screen of the component of the gaming establishment fund management system, the component of the gaming establishment credit system, and/or the gaming establishment device or via use of a suitable input device of the component of the gaming establishment fund management system, the component of the gaming establishment credit system, and/or the gaming establishment device. In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the component of the gaming establishment fund management system, the component of the gaming establishment credit system, and/or the gaming establishment device by touching the touch screen at the appropriate locations.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the component of the gaming establishment fund management system, the component of the gaming establishment credit system, and/or the gaming establishment device. In one embodiment, a user input device docking region is provided, and includes a power distribution component that is configured to recharge a user input device without requiring metal-to-metal contact. In one embodiment, the at least one power distribution component is configured to distribute power to one or more internal components of the component of the gaming establishment fund management system, the component of the gaming establishment credit system, and/or the gaming establishment device, such as one or more rechargeable power sources (e.g., rechargeable batteries) located at the component of the gaming establishment fund management system, the component of the gaming establishment credit system, and/or the gaming establishment device.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the component of the gaming establishment fund management system, the component of the gaming establishment credit system, and/or the gaming establishment device; detecting the presence and/or identity of various persons (e.g., users, casino employees, etc.), devices (e.g., user input devices), and/or systems within a predetermined proximity to the component of the gaming establishment fund management system, the component of the gaming establishment credit system, and/or the gaming establishment device.

The at least one data preservation component is configured to detect or sense one or more events and/or conditions that, for example, may result in damage to the component of the gaming establishment fund management system, the component of the gaming establishment credit system, and/or the gaming establishment device and/or that may result in loss of information associated with the component of the gaming establishment fund management system, the component of the gaming establishment credit system, and/or the gaming establishment device. Additionally, the data preservation system may be operable to initiate one or more appropriate action(s) in response to the detection of such events/conditions.

The at least one motion/gesture analysis and interpretation component is configured to analyze and/or interpret information relating to detected user movements and/or gestures to determine appropriate user input information relating to the detected user movements and/or gestures. For example, in one embodiment, the at least one motion/gesture analysis and interpretation component is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source enables the component of the gaming establishment fund management system, the component of the gaming establishment credit system, and/or the gaming establishment device to operate in a mobile environment.

The at least one geolocation module is configured to acquire geolocation information from one or more remote sources and use the acquired geolocation information to determine information relating to a relative and/or absolute position of the component of the gaming establishment fund management system, the component of the gaming establishment credit system, and/or the gaming establishment device. For example, in one implementation, the at least one geolocation module is configured to receive GPS signal information for use in determining the position or location of the component of the gaming establishment fund management system, the component of the gaming establishment credit system, and/or the gaming establishment device. In another implementation, the at least one geolocation module is configured to receive multiple wireless signals from multiple remote devices (e.g., the component of the gaming establishment fund management system, the gaming establishment credit system, the gaming establishment devices, servers, wireless access points, etc.) and use the signal information to compute position/location information relating to the position or location of the component of the gaming establishment fund management system, the component of the gaming establishment credit system, and/or the gaming establishment device.

The at least one user identification module is configured to determine the identity of the current user or current owner of the component of the gaming establishment fund management system, the component of the gaming establishment credit system, and/or the gaming establishment device. For example, in one embodiment, the current user is required to perform a login process at the component of the gaming establishment fund management system, the component of the gaming establishment credit system, and/or the gaming establishment device in order to access one or more features. Alternatively, the component of the gaming establishment fund management system, the component of the gaming establishment credit system, and/or the gaming establishment device is configured to automatically determine the identity of the current user based on one or more external signals, such as an RFID tag or badge worn by the current user and that provides a wireless signal to the component of the gaming establishment fund management system, the component of the gaming establishment credit system, and/or the gaming establishment device that is used to determine the identity of the current user. In at least one embodiment, various security features are incorporated into the component of the gaming establishment fund management system, the component of the gaming establishment credit system, and/or the gaming establishment device to prevent unauthorized users from accessing confidential or sensitive information.

The at least one information filtering module is configured to perform filtering (e.g., based on specified criteria) of selected information to be displayed at one or more displays of the component of the gaming establishment fund management system, the component of the gaming establishment credit system, and/or the gaming establishment device.

In various embodiments, the component of the gaming establishment fund management system, the component of the gaming establishment credit system, and/or the gaming establishment device includes a plurality of communication ports configured to enable the at least one processor of the component of the gaming establishment fund management system, the component of the gaming establishment credit system, and/or the gaming establishment device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, the component of the gaming establishment fund management system, the component of the gaming establishment credit system, and/or the gaming establishment device has a support structure, housing, or cabinet that provides support for a plurality of the input devices and the output devices of the component of the gaming establishment fund management system, the component of the gaming establishment credit system, and/or the gaming establishment device.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
a processor; and
a memory device that stores a plurality of instructions that, when executed by the processor, cause the processor to:
following an identified user initiating, independent of the system, a transfer of a first amount of cryptocurrency from an external cryptocurrency account to a gaming establishment controlled custodian account associated with the identified user and distinct from a cashless wagering account associated with the identified user:
independently determine whether to authorize the initiated transfer of the first amount of cryptocurrency in association with the gaming establishment controlled custodian account associated with the identified user, and
responsive to the independent determination being to authorize the initiated transfer of the first amount of cryptocurrency, communicate data that enables the first amount of cryptocurrency to be transferred, via an external cryptocurrency blockchain network operating independent of the processor, from the external cryptocurrency account to the gaming establishment controlled custodian account associated with the user, and
following the identified user initiating, when no portion of the first amount of cryptocurrency is pledged as any collateral in association with any lines of credit, a transfer of a second amount of cryptocurrency from the gaming establishment controlled custodian account associated with the identified user to the external cryptocurrency account:
determine, independent of the identified user, whether to authorize the initiated transfer of the second amount of cryptocurrency in association with the gaming establishment controlled custodian account, and
responsive to the determination being to authorize the transfer of the second amount of cryptocurrency, communicate data that enables the second amount of cryptocurrency to be transferred, via the external cryptocurrency blockchain network, from the gaming establishment controlled custodian account associated with the user to the external cryptocurrency account.

2. The system of claim 1, wherein the memory device stores a plurality of further instructions that, when executed by the processor, cause the processor to create the gaming establishment controlled custodian account associated with the identified user.

3. The system of claim 2, wherein the creation of the gaming establishment controlled custodian account associated with the identified user is based on data of the identified user stored in association with a gaming establishment account maintained for the identified user.

4. The system of claim 3, wherein the gaming establishment account comprises one of a player tracking account and the cashless wagering account.

5. The system of claim 1, wherein the memory device stores a plurality of further instructions that, when executed by the processor following a completion of the transfer of the first amount of cryptocurrency to the gaming establishment controlled custodian account associated with the user, cause the processor to enable the first amount of cryptocurrency to be pledged as collateral in association with a line of credit.

6. The system of claim 5, wherein the memory device stores a plurality of further instructions that, when executed by the processor responsive to the first amount of cryptocurrency being pledged as collateral in association with the line of credit, cause the processor to place a hold on the first amount of cryptocurrency.

7. The system of claim 6, wherein the memory device stores a plurality of further instructions that, when executed by the processor responsive to the line of credit being settled, cause the processor to release the hold on the first amount of cryptocurrency.

8. The system of claim 1, wherein the memory device stores a plurality of further instructions that, when executed by the processor responsive to the independent determination being not to authorize the initiated transfer of the first amount of cryptocurrency to the gaming establishment controlled custodian account associated with the identified user based on a transfer limit, cause the processor to not complete the initiated transfer of the first amount of cryptocurrency.

9. The system of claim 1, wherein the memory device stores a plurality of further instructions that, when executed by the processor responsive to the determination being not to authorize the transfer of the second amount of cryptocurrency to the external cryptocurrency account associated with the identified user based on a transfer restriction, cause the processor to not complete the initiated transfer of the second amount of cryptocurrency.

10. A system comprising:
a processor; and
a memory device that stores a plurality of instructions that, when executed by the processor following an identified user initiating, independent of the system, a transfer of an amount of cryptocurrency from an external cryptocurrency account to a gaming establishment controlled custodian account associated with the identified user and distinct from a cashless wagering account associated with the identified user, cause the processor to:
responsive to a first independent determination to authorize a complete transfer, via an external cryptocurrency blockchain network operating independent of the processor, of the amount of cryptocurrency to the gaming establishment controlled custodian account associated with the identified user, communicate data that enables the amount of cryptocurrency to be transferred from the external cryptocurrency account to the gaming establishment controlled custodian account associated with the user, wherein following the complete transfer, at least a portion of the amount of cryptocurrency is available to be pledged as collateral for a line of credit, and responsive to a second independent determination to authorize a pending transfer of the first amount of cryptocurrency to the gaming establishment controlled custodian account associated with the identified user, communicate data that results in the amount of cryptocurrency being pending as transferred, in association with the external cryptocurrency blockchain network, from the external cryptocurrency account to the gaming establishment controlled custodian account associated with the user, wherein while the transfer is pending, the amount of cryptocurrency is unavailable to be pledged as collateral for any line of credit.

11. The system of claim 10, wherein the memory device stores a plurality of further instructions that, when executed by the processor responsive to a validation of at least one of the identified user and the gaming establishment controlled custodian account associated with the identified user, cause the processor to convert the pending transfer to the complete transfer.

12. A method of operating a system, the method comprising:

following an identified user initiating, independent of the system, a transfer of a first amount of cryptocurrency from an external cryptocurrency account to a gaming establishment controlled custodian account associated with the identified user and distinct from a cashless wagering account associated with the identified user:

independently determining, by a processor of the system, whether to authorize the initiated transfer of the first amount of cryptocurrency in association with the gaming establishment controlled custodian account associated with the identified user, and responsive to the independent determination being to authorize the initiated transfer of the first amount of cryptocurrency, communicating data that enables the first amount of cryptocurrency to be transferred, via an external cryptocurrency blockchain network operating independent of the processor from the external cryptocurrency account to the gaming establishment controlled custodian account associated with the user, and following the identified user initiating, when no portion of the first amount of cryptocurrency is pledged as any collateral in association with any lines of credit, a transfer of a second amount of cryptocurrency from the gaming establishment controlled custodian account associated with the identified user to the external cryptocurrency account:

determining, by the processor and independent of the identified user, whether to authorize the initiated transfer of the second amount of cryptocurrency in association with the gaming establishment controlled custodian account, and responsive to the determination being to authorize the transfer of the second amount of cryptocurrency, communicating data that enables the second amount of cryptocurrency to be transferred, via the external cryptocurrency blockchain network, from the gaming establishment controlled custodian account associated with the user to the external cryptocurrency account.

13. The method of claim 12, further comprising creating, by the processor, the gaming establishment controlled custodian account associated with the identified user.

14. The method of claim 13, wherein creating, by the processor, the gaming establishment controlled custodian account associated with the identified user is based on data of the identified user stored in association with a gaming establishment account maintained for the identified user.

15. The method of claim 14, wherein the gaming establishment account comprises one of a player tracking account and the cashless wagering account.

16. The method of claim 12, further comprising, following a completion of the transfer of the first amount of cryptocurrency to the gaming establishment controlled custodian account associated with the user, enabling, by the processor, the first amount of cryptocurrency to be pledged as collateral in association with a line of credit.

17. The method of claim 16, further comprising, responsive to the first amount of cryptocurrency being pledged as collateral in association with the line of credit, placing, by the processor, a hold on the first amount of cryptocurrency.

18. The method of claim 17, further comprising, responsive to the line of credit being settled, releasing, by the processor, the hold on the first amount of cryptocurrency.

19. The method of claim 12, further comprising, responsive to the independent determination being not to authorize the initiated transfer of the first amount of cryptocurrency to the gaming establishment controlled custodian account associated with the identified user based on a transfer limit, not completing the initiated transfer of the first amount of cryptocurrency.

20. The method of claim 12, further comprising, responsive to the determination being not to authorize the transfer of the second amount of cryptocurrency to the external cryptocurrency account associated with the identified user based on a transfer restriction, not completing the initiated transfer of the second amount of cryptocurrency.

* * * * *